(12) United States Patent
Chen et al.

(10) Patent No.: US 12,271,054 B2
(45) Date of Patent: Apr. 8, 2025

(54) IMAGING OPTICAL LENS ASSEMBLY, IMAGE CAPTURING APPARATUS AND ELECTRONIC DEVICE

(71) Applicant: LARGAN PRECISION CO., LTD., Taichung (TW)

(72) Inventors: Kuan-Ming Chen, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/398,661

(22) Filed: Dec. 28, 2023

(65) Prior Publication Data

US 2024/0134153 A1   Apr. 25, 2024

Related U.S. Application Data

(63) Continuation of application No. 17/511,732, filed on Oct. 27, 2021, now Pat. No. 11,886,038, which is a continuation of application No. 16/884,380, filed on May 27, 2020, now Pat. No. 11,187,873, which is a continuation of application No. 16/268,775, filed on Feb. 6, 2019, now Pat. No. 10,705,316, which is a continuation of application No. 15/603,630, filed on May 24, 2017, now Pat. No. 10,247,911, which is a
(Continued)

(30) Foreign Application Priority Data

Dec. 15, 2015 (TW) .................................. 104142068

(51) Int. Cl.
*G02B 9/60* (2006.01)
*G02B 13/00* (2006.01)

(52) U.S. Cl.
CPC .......... *G02B 9/60* (2013.01); *G02B 13/0015* (2013.01); *G02B 13/0045* (2013.01)

(58) Field of Classification Search
None
See application file for complete search history.

(56) References Cited

U.S. PATENT DOCUMENTS

| 3,982,821 A | 9/1976 | Shoemaker |
| 5,026,149 A | 6/1991 | Braat |
| 5,485,313 A | 1/1996 | Betensky |

(Continued)

FOREIGN PATENT DOCUMENTS

| CN | 1847908 A | 10/2006 |
| CN | 101359088 A | 2/2009 |

(Continued)

*Primary Examiner* — Darryl J Collins
(74) *Attorney, Agent, or Firm* — Troutman Pepper Locke LLP; Tim Tingkang Xia, Esq.

(57) ABSTRACT

The present disclosure provides an imaging optical lens assembly, including, in order from an object side to an image side: a first lens element with negative refractive power having an object-side surface being concave in a paraxial region, a second lens element with positive refractive power, a third lens element with negative refractive power, a fourth lens element with positive refractive power, and a fifth lens element with negative refractive power having an image-side surface being concave in a paraxial region and at least one convex shape in an off-axial region on the image-side surface, wherein the imaging optical lens assembly has a total of five lens elements.

27 Claims, 24 Drawing Sheets

Related U.S. Application Data continuation of application No. 15/131,452, filed on Apr. 18, 2016, now Pat. No. 9,696,519.

(56) References Cited

U.S. PATENT DOCUMENTS

| | | | |
|---|---|---|---|
| 5,600,489 | A | 2/1997 | Ueda et al. |
| 5,781,350 | A | 7/1998 | Tachihara et al. |
| 5,808,808 | A | 9/1998 | Yamanashi |
| 8,649,113 | B1 | 2/2014 | Tsai et al. |
| 8,687,293 | B2 | 4/2014 | Chen et al. |
| 8,743,485 | B2 | 6/2014 | Hsieh et al. |
| 8,792,185 | B2 | 7/2014 | Hsu et al. |
| 8,908,288 | B2 | 12/2014 | Hsu et al. |
| 9,223,114 | B2 | 12/2015 | Tsai et al. |
| 9,235,031 | B2 | 1/2016 | Chung et al. |
| 9,250,420 | B2 | 2/2016 | Hsu et al. |
| 9,335,514 | B2 | 5/2016 | Hsieh et al. |
| 9,417,438 | B2 | 8/2016 | Lin et al. |
| 9,435,985 | B2 | 9/2016 | Liao et al. |
| 2011/0096413 | A1 | 4/2011 | Lo et al. |
| 2011/0273611 | A1 | 11/2011 | Matsusaka et al. |
| 2013/0308206 | A1* | 11/2013 | Hsu .................. G02B 13/0045 359/714 |
| 2014/0085735 | A1* | 3/2014 | Shih .................. G02B 13/04 359/770 |
| 2014/0247509 | A1 | 9/2014 | Tsai |
| 2014/0268369 | A1 | 9/2014 | Chen et al. |
| 2015/0009580 | A1 | 1/2015 | Lee |
| 2015/0036044 | A1 | 2/2015 | Hsu et al. |
| 2015/0036045 | A1 | 2/2015 | Hsu et al. |
| 2015/0098137 | A1 | 4/2015 | Chung et al. |
| 2015/0219879 | A1 | 8/2015 | Zhao et al. |
| 2015/0338610 | A1 | 11/2015 | Hsieh et al. |
| 2016/0004064 | A1* | 1/2016 | Harada ............... G02B 23/243 359/740 |
| 2016/0065811 | A1 | 3/2016 | Jo |
| 2016/0065812 | A1 | 3/2016 | Jo |
| 2016/0154212 | A1 | 6/2016 | Park, II et al. |
| 2016/0170177 | A1 | 6/2016 | Tang et al. |
| 2016/0170178 | A1 | 6/2016 | Tang et al. |
| 2016/0170179 | A1 | 6/2016 | Jojiki |
| 2016/0195695 | A1 | 7/2016 | Tang et al. |
| 2016/0195699 | A1 | 7/2016 | Tang et al. |
| 2016/0377837 | A1 | 12/2016 | Liu et al. |
| 2016/0377838 | A1* | 12/2016 | Liu .................. G02B 13/0045 359/714 |
| 2017/0010446 | A1 | 1/2017 | Liu et al. |
| 2017/0010447 | A1* | 1/2017 | Liu .................. G02B 13/0045 |
| 2017/0038557 | A1 | 2/2017 | Chen et al. |
| 2017/0123185 | A1 | 5/2017 | Choi et al. |

FOREIGN PATENT DOCUMENTS

| | | |
|---|---|---|
| CN | 201222114 Y | 4/2009 |
| CN | 101796449 A | 8/2010 |
| CN | 203606555 U | 5/2014 |
| CN | 204009194 U | 12/2014 |
| CN | 104280862 A | 1/2015 |
| CN | 105425368 A | 3/2016 |
| CN | 106646822 A | 5/2017 |
| JP | 07174972 | 7/1995 |
| JP | 7253535 | 10/1995 |
| JP | H08313804 A | 11/1996 |
| JP | H10221601 A | 8/1998 |
| JP | H11072720 A | 3/1999 |
| JP | H11326789 A | 11/1999 |
| JP | 200469777 A | 3/2004 |
| JP | 2004069777 | 3/2004 |
| JP | 2007047334 A | 2/2007 |
| JP | 2009145809 A | 7/2009 |
| JP | 2009223251 | 10/2009 |
| JP | 2010008562 A | 1/2010 |
| JP | 2012103717 | 5/2012 |
| JP | 2012113311 | 6/2012 |
| JP | 2012211933 | 11/2012 |
| JP | 2012211934 A | 11/2012 |
| JP | 2012211935 A | 11/2012 |
| JP | 2014160141 A | 9/2014 |
| JP | 2015001644 A | 1/2015 |
| JP | 2015031956 A | 2/2015 |
| JP | 2016014754 A | 1/2016 |
| KR | 20100001525 A | 1/2010 |
| TW | 200722785 A | 6/2007 |
| TW | 201432300 A | 8/2014 |
| TW | 201520592 A | 6/2015 |
| WO | 2010024214 A1 | 3/2010 |
| WO | 2011027690 A1 | 3/2011 |
| WO | 2012132456 | 10/2012 |
| WO | 2016003211 A1 | 1/2016 |

* cited by examiner

IMAGING OPTICAL LENS ASSEMBLY, IMAGE CAPTURING APPARATUS AND ELECTRONIC DEVICE

RELATED APPLICATIONS

This application is a continuation application of U.S. application Ser. No. 17/511,732 filed on Oct. 27, 2021, now approved, which is a continuation application of U.S. application Ser. No. 16/884,380 filed on May 27, 2020, now issued to U.S. Pat. No. 11,187,873B2, which is a continuation application of U.S. application Ser. No. 16/268,775 filed on Feb. 6, 2019, now issued to U.S. Pat. No. 10,705,316B2, which is a continuation application of U.S. application Ser. No. 15/603,630 filed on May 24, 2017, now issued to U.S. Pat. No. 10,247,911B2, which is a continuation application of U.S. application Ser. No. 15/131,452 filed on Apr. 18, 2016, now issued to U.S. Pat. No. 9,696,519B1 and claims priority to Taiwan Application Serial Number 104142068, filed on Dec. 15, 2015, which is incorporated by reference herein in its entirety.

BACKGROUND

Technical Field

The present disclosure relates to an imaging optical lens assembly and an image capturing apparatus, and more particularly, to an imaging optical lens assembly and an image capturing apparatus applicable to electronic devices.

Description of Related Art

In addition to applications in mobile devices, photographing modules have a wide range of applications. Utilizing photographing modules in various intelligent electronic products, such as vehicular devices and intelligent household appliances has become a trend in recent technological developments. As more and more devices, such as mobile phones, tablet computers, optical recognition devices, rear view cameras, driving recording systems and drone cameras, have been equipped with photographing modules in order to expand the range of applications, there is an increasing demand for lens systems with high image quality and specifications.

Currently, there is a trend in the market towards miniaturized photographing modules featuring wide angles of view and applicable for various intelligent electronic devices, driving cameras, surveillance cameras, sports cameras, drone cameras, recreational devices, and portable devices associated with many parts of our daily lives. A conventional lens assembly with a wide field of view usually requires lens elements of a larger size to retrieve light so as to capture an image of a larger area. However, such an arrangement often increases the total track length of the lens assembly and makes it difficult to reduce the size of the product equipped with the lens assembly. Furthermore, the field of view of a conventional miniaturized lens module is limited due to the strict size requirement of the lens module. Therefore, the conventional design can no longer meet the specifications and requirements of products in the market of the foreseeable future.

SUMMARY

According to one aspect of the present disclosure, an imaging optical lens assembly comprises, in order from an object side to an image side: a first lens element with negative refractive power having an object-side surface being concave in a paraxial region thereof; a second lens element having positive refractive power; a third lens element having negative refractive power; a fourth lens element having positive refractive power; and a fifth lens element with negative refractive power having an image-side surface being concave in a paraxial region thereof, and at least one convex shape in an off-axial region on the image-side surface; wherein the imaging optical lens assembly has a total of five lens elements; and wherein a curvature radius of the object-side surface of the first lens element is R1, a curvature radius of an object-side surface of the second lens element is R3, a curvature radius of an image-side surface of the second lens element is R4, a focal length of the imaging optical lens assembly is f, a focal length of the third lens element is f3, a focal length of the fifth lens element is f5, and the following conditions are satisfied:

$|R4/R3|<1.0;$ $f5/f3<1.0;$ $-10.0<R1/f<0.$

According to another aspect of the present disclosure, an imaging optical lens assembly comprises, in order from an object side to an image side: a first lens element with negative refractive power having an object-side surface being concave in a paraxial region thereof, and at least one convex shape in an off-axial region on the object-side surface; a second lens element having positive refractive power; a third lens element; a fourth lens element having positive refractive power; and a fifth lens element with negative refractive power having an image-side surface being concave in a paraxial region thereof, and at least one convex shape in an off-axial region on the image-side surface; wherein the imaging optical lens assembly has a total of five lens elements; and wherein a curvature radius of an object-side surface of the second lens element is R3, a curvature radius of an image-side surface of the second lens element is R4, a focal length of the first lens element is f1, a focal length of the third lens element is f3, a vertical distance between an off-axial critical point on the object-side surface of the first lens element and an optical axis is Yc11, a vertical distance between an off-axial critical point on the image-side surface of the fifth lens element and the optical axis is Yc52, and the following conditions are satisfied:

$|R4/R3|<2.0;$ $f1/f3<2.0;$ $0.15<Yc11/Yc52<1.20.$

According to still another aspect of the present disclosure, an imaging optical lens assembly comprises, in order from an object side to an image side: a first lens element with negative refractive power having an object-side surface being concave in a paraxial region thereof, and at least one convex shape in an off-axial region on the object-side surface; a second lens element having positive refractive power; a third lens element; a fourth lens element with positive refractive power having an image-side being surface being convex in a paraxial region thereof; and a fifth lens element with negative refractive power having an image-side surface being concave in a paraxial region thereof, and at least one convex shape in an off-axial region on the image-side surface; wherein the imaging optical lens assembly has a total of five lens elements and further comprises an aperture stop disposed between the first lens element and the second lens element; and wherein a curvature radius of an object-side surface of the second lens element is R3, a curvature radius of an image-side surface of the second lens element is R4, a focal length of the first lens element is f1, a focal length of the third lens element is f3, and the following conditions are satisfied:

$|R4/R3|<4.0;$ $f1/f3<5.0.$

According to yet another aspect of the present disclosure, an image capturing apparatus includes the aforementioned imaging optical lens assembly and an image sensor disposed on an image surface of the imaging optical lens assembly.

According to a further aspect of the present disclosure, an electronic device includes the aforementioned image capturing apparatus.

DETAILED DESCRIPTION

The present disclosure provides an imaging optical lens assembly including, in order from an object side to an image side, a first lens element, a second lens element, a third lens element, a fourth lens element, and a fifth lens element.

The first lens element has negative refractive power so that a wide field of view can be favorably achieved, thereby obtaining a larger image forming region. The first lens element has an object-side surface being concave in a paraxial region thereof, and may have at least one convex shape in an off-axial region on the object-side surface thereof to enhance the feature of a wide field of view and thereby to obtain a larger image forming region.

Figure 10:
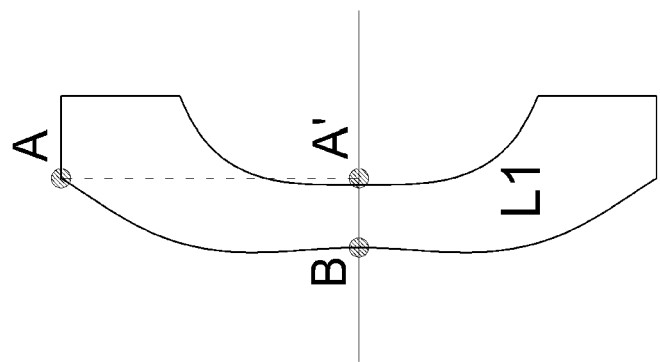
FIG. 10 is a schematic view showing point A, point A' and point B of a first lens element of the present disclosure.

Please refer to FIG. 10. When a projected position (A') on an optical axis from an effective radius position (A) on the object-side surface of the first lens element can be closer to the image side than a position (B) of the object-side surface of the first lens element on the optical axis, it is favorable for reducing the incident angle of light on the object-side surface of the first lens element from an off-axis region to prevent total reflection caused by an excessively large angle.

The second lens element has positive refractive power so that it has a complementary function to the first lens element, thereby providing the imaging optical lens assembly with a sufficient converging ability to prevent the total track length of the lens assembly from being too long.

The third lens element may have negative refractive power, thus it is favorable for coordinating the light converging ability in an off-axial view field and thereby to correct the Petzval Sum. The third lens element may have an object-side surface being convex and an image-side surface being concave thereof so that the principal point thereof can be shifted toward the image side to favorably enlarge the field of view.

The fourth lens element has positive refractive power so as to enhance the focusing power and concurrently achieve the goal of miniaturization of the imaging optical lens assembly. The fourth lens element may have an image-side surface being convex in a paraxial region thereof to further improve the focusing performance.

The fifth lens element has negative refractive power so as to correct the field curvature to further improve the image quality. The fifth lens element has an image-side surface being concave in a paraxial region thereof and at least one convex shape in an off-axial region on the image-side surface thereof so as to favorably shorten the back focal length for further miniaturization. The fifth lens element may have an object-side surface being convex so as to correct aberrations of the imaging optical lens assembly.

The imaging optical lens assembly has a total of five lens elements, and an axial distance between the first lens element and the second lens element may be the largest among respective axial distances between every two adjacent lens elements of the first lens element, the second lens element, the third lens element, the fourth lens element, and the fifth lens element so as to attain a balance between the wide field of view and the miniaturization of the imaging optical lens assembly.

The imaging optical lens assembly may comprise an aperture stop disposed between the first lens element and the second lens element, and such a configuration is advantageous with a wide field of view. Moreover, each of the first lens element, the second lens element, the third lens element, the fourth lens element, and the fifth lens element may have at least one surface being aspheric so as to correct the aberrations and to further shorten the total track length of the imaging optical lens assembly.

When a curvature radius of an object-side surface of the second lens element is R3, a curvature radius of an image-side surface of the second lens element is R4, and the following condition is satisfied: |R4/R3|<4.0, the principal point of the second lens element can be shifted toward the image side so that a wide field of view can be obtained. Preferably, the following condition can be satisfied: |R4/R3|<2.0. More preferably, the following condition can be satisfied: |R4/R3|<1.0. More preferably, the following condition can be satisfied: |R4/R3|<0.60.

When a focal length of the third lens element is f3, a focal length of the fifth lens element is f5, and the following condition can be satisfied: f5/f3<1.0, the refractive power of the imaging optical lens assembly can be balanced so that the fifth lens element is capable of controlling the optical path, and the third lens element can effectively correct various aberrations to improve the image quality.

When a curvature radius of the object-side surface of the first lens element is R1, a focal length of the imaging optical lens assembly is f, and the following condition can be satisfied: −10.0<R1/f<0, the light diverging ability of the first lens element can be enhanced to correspond with the feature of a wide field of view, thereby obtaining a larger image forming region to extend the range of applications for the imaging optical lens assembly. Preferably, the following condition can be satisfied: −5.0<R1/f<0. More preferably, the following condition can be satisfied: −3.0<R1/f<0.

When a focal length of the first lens element is f1, the focal length of the third lens element is f3, and the following condition can be satisfied: f1/f3<5.0, the negative refractive power of the imaging optical lens assembly can be effectively distributed, thereby reducing aberrations while maintaining a wide field of view. Preferably, the following condition can be satisfied: f1/f3<2.0.

When a vertical distance between an off-axial critical point on the object-side surface of the first lens element and the optical axis is Yc11, a vertical distance between an off-axial critical point on the image-side surface of the fifth lens element and the optical axis is Yc52, and the following condition can be satisfied: 0.15<Yc11/Yc52<1.20, the off-axial light of the first lens element and the fifth lens element can be effectively controlled, thus the imaging optical lens assembly can be further miniaturized while featuring a wide field of view.

When an axial distance between the object-side surface of the first lens element and an image surface is TL, a maximum image height of the imaging optical lens assembly is ImgH, and the following condition can be satisfied: TL/ImgH<3.0, the total track length of the imaging optical lens assembly can be effectively controlled, which is favorable for the miniaturization of the imaging optical lens assembly.

When an Abbe number of the third lens element is V3, an Abbe number of the fourth lens element is V4, an Abbe number of the fifth lens element is V5, and the following condition can be satisfied: 0.3<(V3+V5)/V4<1.0, the chromatic aberration of the whole imaging optical lens assembly can be balanced such that light of different wavelengths can be converged at the same image point to improve the image quality. Preferably, the following condition can be satisfied: V5<30.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following condition can be satisfied: 0<(T23+T34+T45)/T12<0.90, a satisfactory balance between a wide field of view and a short total track length can be obtained.

When half of a maximal field of view of the imaging optical lens assembly is HFOV, and the following condition can be satisfied: 1.50<tan(HFOV), the image scope can be effectively controlled and a sufficient field of view can be achieved.

Figure 11:
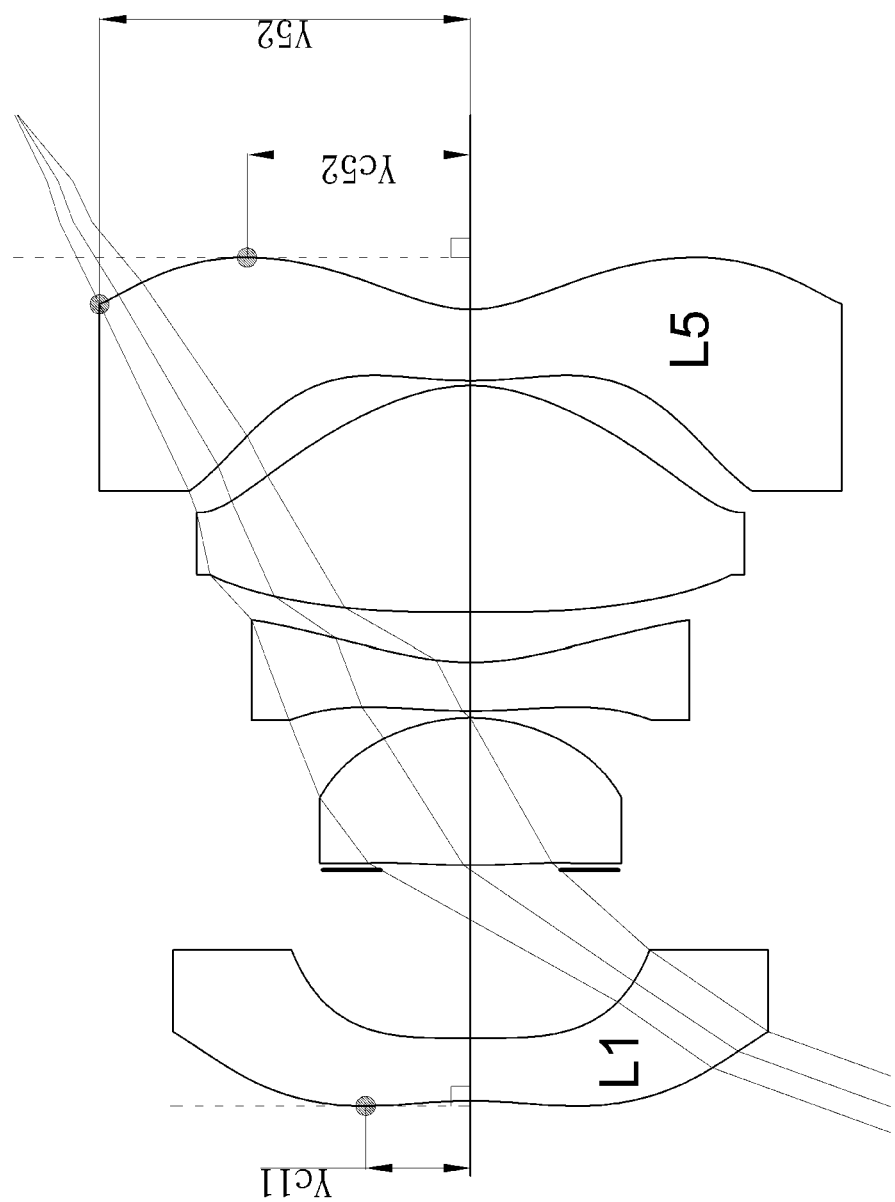
FIG. 11 is a schematic view showing distances represented by the parameters Yc11, Yc52 and Y52 of an image capturing apparatus.
Figure 12A:
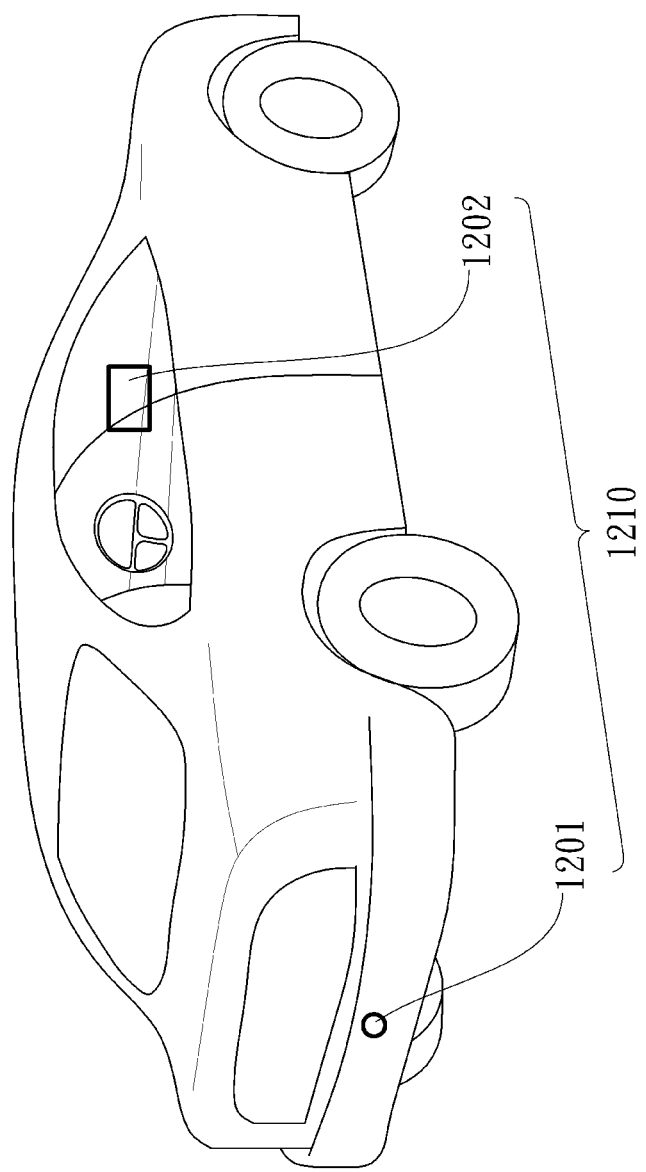
FIG. 12A shows a rear view camera with an image capturing apparatus of the present disclosure installed therein.
Figure 12B:
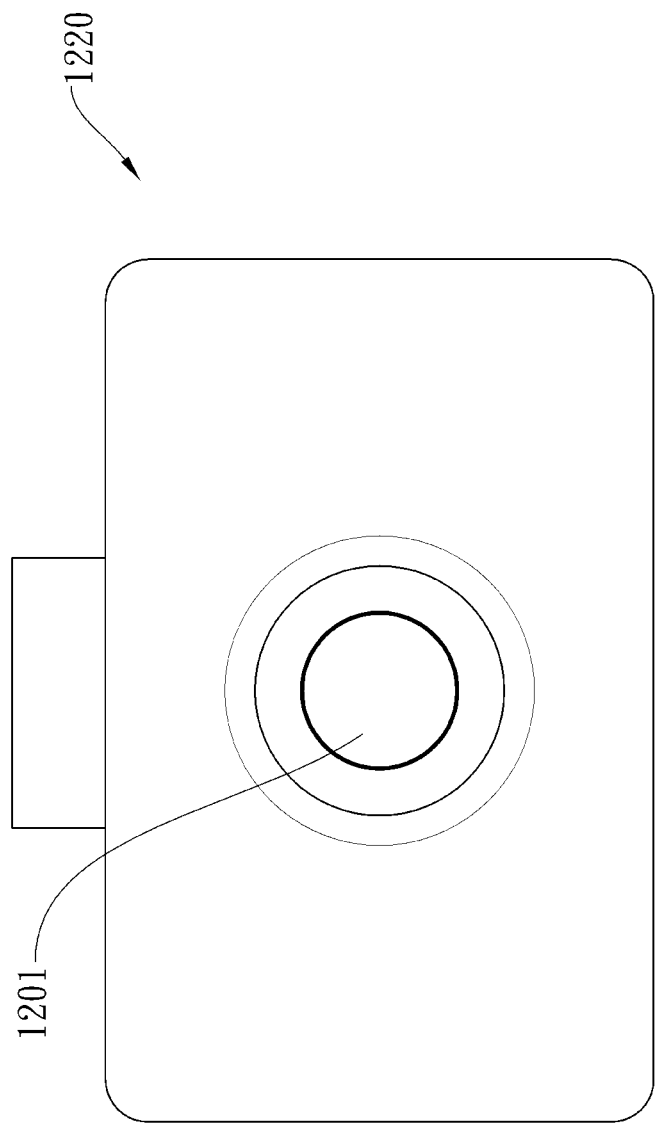
FIG. 12B shows a driving recording system with an image capturing apparatus of the present disclosure installed therein.
Figure 12C:
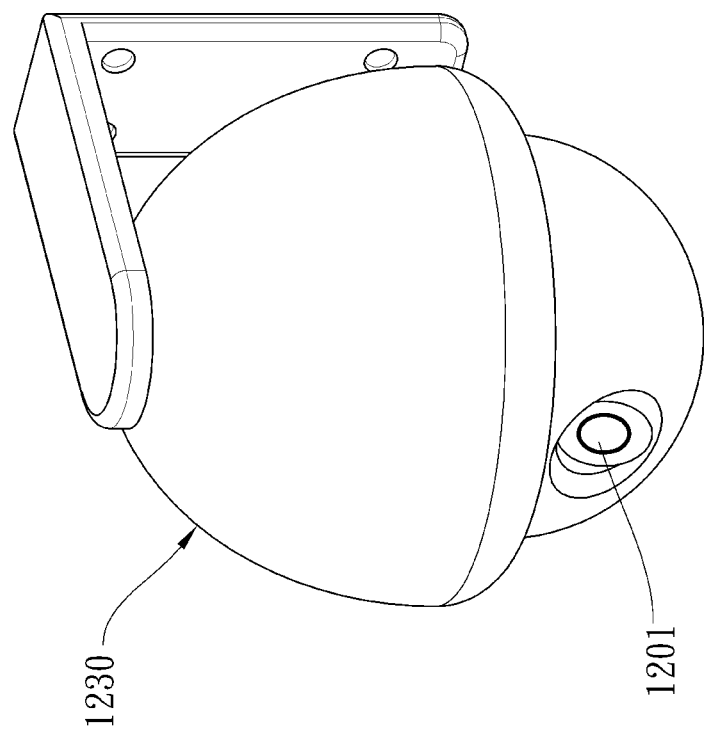
FIG. 12C shows a surveillance camera with an image capturing apparatus of the present disclosure installed therein.
Figure 12D:
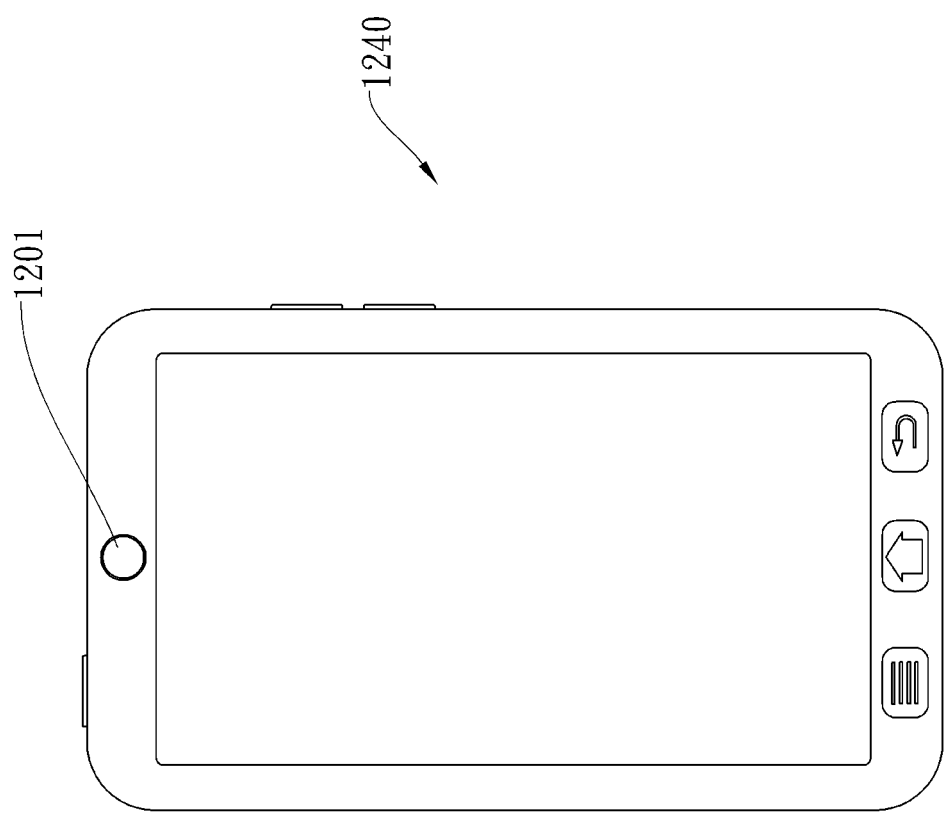
FIG. 12D shows a smart phone with an image capturing apparatus of the present disclosure installed therein.

Please refer to FIG. 11. When a vertical distance between a maximum effective diameter position on the image-side surface of the fifth lens element and an optical axis is Y52, the focal length of the imaging optical lens assembly is f, and the following condition can be satisfied: 0.85<Y52/f, the off-axial aberration caused by a large view angle can be corrected and the relative illumination in the off-axial region can be increased.

When the vertical distance between the off-axial critical point on the object-side surface of the first lens element and the optical axis is Yc11, the focal length of the imaging optical lens assembly is f, and the following condition can be satisfied: 0.10<Yc11/f<0.80, the off-axial aberration caused by a large view angle can be corrected and the relative illumination in the off-axial region can be increased.

When the maximum image height of the imaging optical lens assembly is ImgH, the focal length of the imaging optical lens assembly is f, and the following condition can be satisfied: 1.20<ImgH/f<1.70, the imaging optical lens assembly can maintain a sufficient image forming region to receive light for brighter images while obtaining a wide field of view at the same time.

When the focal length of the third lens element is f3, a focal length of the fourth lens element is f4, and the following condition can be satisfied: |f4/f3|<1.0, the distribution of the refractive power of the imaging optical lens assembly can be balanced, thereby reducing the sensitivity of the imaging optical lens assembly.

When the focal length of the first lens element is f1, a focal length of the second lens element is f2, the focal length of the third lens element is f3, the focal length of the fourth lens element is f4, the focal length of the fifth lens element is f5, a focal length of the i-th lens element is fi, a focal length of the j-th lens element is fj, and the following conditions can be satisfied: $|f1|>|fi|$, $i=2,4,5$; $|f3|>|fj|$ $j=2,4,5$, the distribution of the refractive power of the imaging optical lens assembly can be balanced, and this is favorable for forming a wide field of view.

When an axial distance between the image-side surface of the fifth lens element and the image surface is BL, the maximum image height of the imaging optical lens assembly is ImgH, and the following condition can be satisfied: BL/ImgH<0.75, the back focal length can be effectively controlled.

According to the imaging optical lens assembly of the present disclosure, the lens elements thereof can be made of glass or plastic material. When the lens elements are made of glass material, the distribution of the refractive power of the imaging optical lens assembly may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required number of lens elements, the total track length of the imaging optical lens assembly can be effectively reduced.

According to the imaging optical lens assembly of the present disclosure, the imaging optical lens assembly can include at least one stop, such as an aperture stop, a glare stop or a field stop, so as to favorably reduce the amount of stray light and thereby to improve the image quality.

According to the imaging optical lens assembly of the present disclosure, an aperture stop can be configured as a front stop or a middle stop. A front stop disposed between an imaged object and the first lens element can provide a longer distance between an exit pupil of the imaging optical lens assembly and the image surface, so that the generated telecentric effect can improve the image-sensing efficiency of an image sensor, such as a CCD or CMOS sensor. A middle stop disposed between the first lens element and the image surface is favorable for enlarging the field of view of the imaging optical lens assembly, thereby providing the imaging optical lens assembly the advantages of a wide-angle lens.

According to the imaging optical lens assembly of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the imaging optical lens assembly of the present disclosure, the image surface of the imaging optical lens assembly, based on the corresponding image sensor, can be a plane or a curved surface with any curvature, especially a curved surface being concave facing towards the object side.

The imaging optical lens assembly of the present disclosure can be optionally applied to moving focus optical systems. According to the imaging optical lens assembly of the present disclosure, the imaging optical lens assembly features a good correction capability and high image quality, and can be applied to 3D (three-dimensional) image capturing applications and electronic devices, such as digital cameras, mobile devices, smart phones, digital tablets, smart TVs, network surveillance devices, motion sensing input devices, driving recording systems, rear view camera systems, drone cameras and wearable devices.

According to the present disclosure, an image capturing apparatus includes the aforementioned imaging optical lens assembly and an image sensor, wherein the image sensor is disposed on or near an image surface of the imaging optical lens assembly. Therefore, the design of the imaging optical lens assembly enables the image capturing apparatus to achieve the best image quality. Preferably, the imaging optical lens assembly can further include a barrel member, a holder member or a combination thereof.

Referring to FIG. 12A, FIG. 12B, FIG. 12C and FIG. 12D, an image capturing apparatus 1201 may be installed in an electronic device including, but not limited to, a rear view camera 1210 a driving recording system 1220, a surveillance camera 1230, or a smart phone 1240. The four exemplary figures of different electronic devices are only exemplary for showing the image capturing apparatus of the present disclosure installed in an electronic device, and the present disclosure is not limited thereto. Preferably, the electronic device can further include a control unit, a display unit, a storage unit, a random access memory unit (RAM) or a combination thereof.

According to the above description of the present disclosure, the following 1st-9th specific embodiments are provided for further explanation.

1st Embodiment

Figure 1A:
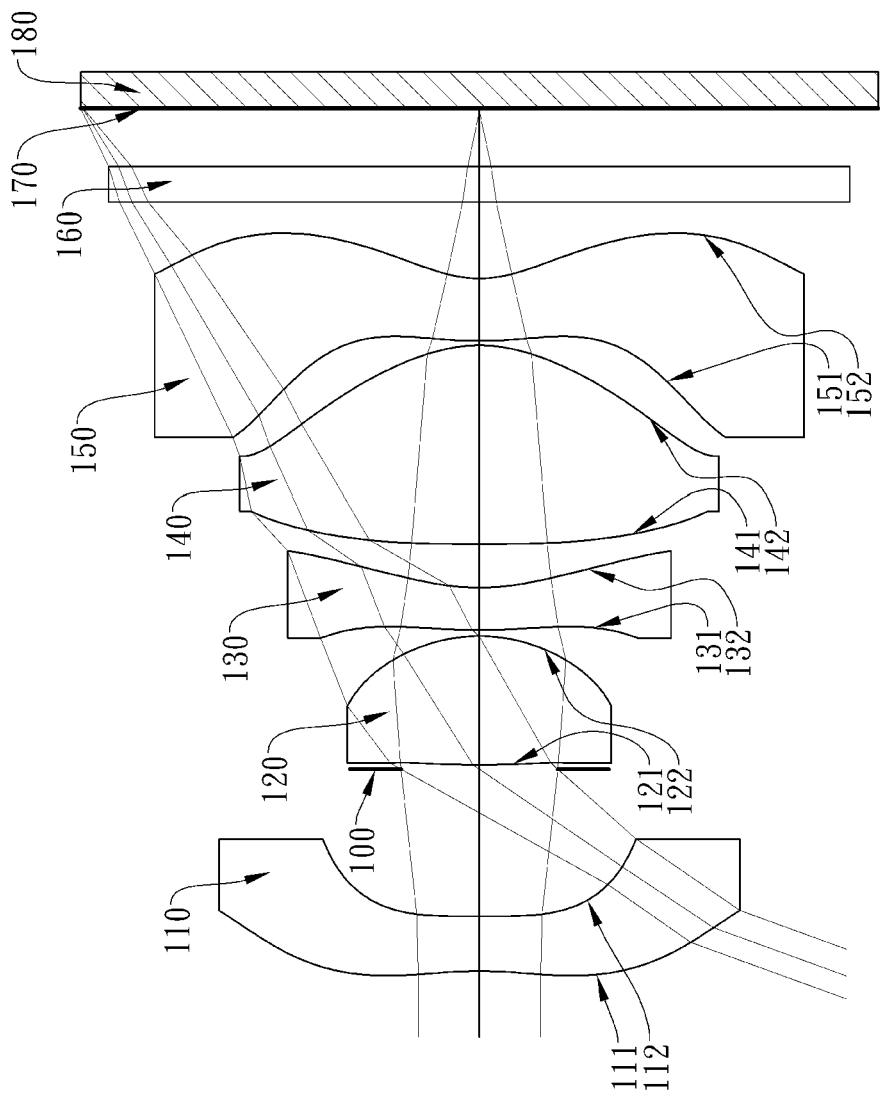
FIG. 1A is a schematic view of an image capturing apparatus according to the 1st embodiment of the present disclosure.
Figure 1B:
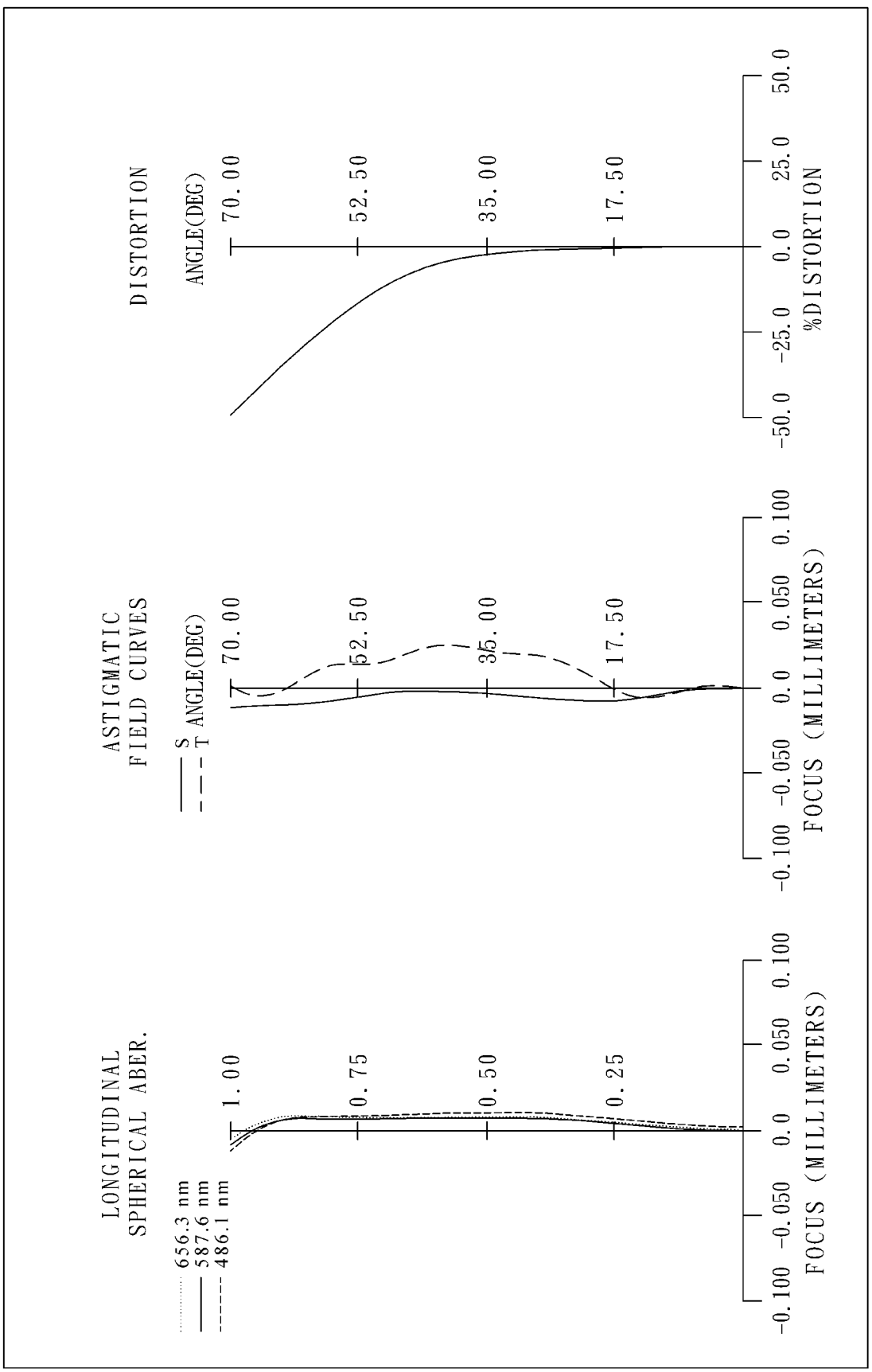
FIG. 1B shows longitudinal spherical aberration curves, astigmatic field curves and a distortion curve of the image capturing apparatus according to the 1st embodiment.

FIG. 1A is a schematic view of an image capturing apparatus according to the 1st embodiment of the present disclosure. FIG. 1B shows, in order from left to right, longitudinal spherical aberration curves, astigmatic field curves and a distortion curve of the image capturing apparatus according to the 1st embodiment.

In FIG. 1A, the image capturing apparatus includes an imaging optical lens assembly (not otherwise herein labeled) of the present disclosure and an image sensor 180. The imaging optical lens assembly includes, in order from an object side to an image side, a first lens element 110, an aperture stop 100, a second lens element 120, a third lens element 130, a fourth lens element 140, and a fifth lens element 150.

The first lens element 110 with negative refractive power has an object-side surface 111 being concave in a paraxial region thereof and an image-side surface 112 being concave in a paraxial region thereof, which are both aspheric, and at least one convex shape in an off-axial region on the object-side surface 111. The first lens element 110 is made of plastic material.

The second lens element 120 with positive refractive power has an object-side surface 121 being convex in a paraxial region thereof and an image-side surface 122 being convex in a paraxial region thereof, which are both aspheric, and the second lens element 120 is made of plastic material.

The third lens element 130 with negative refractive power has an object-side surface 131 being convex in a paraxial region thereof and an image-side surface 132 being concave in a paraxial region thereof, which are both aspheric, and the third lens element 130 is made of plastic material.

The fourth lens element 140 with positive refractive power has an object-side surface 141 being convex in a paraxial region thereof and an image-side surface 142 being convex in a paraxial region thereof, which are both aspheric, and the fourth lens element 140 is made of plastic material.

The fifth lens element 150 with negative refractive power has an object-side surface 151 being convex in a paraxial region thereof and an image-side surface 152 being concave in a paraxial region thereof, which are both aspheric, and at least one convex shape in an off-axial region on the image-side surface 111. The fifth lens element 150 is made of plastic material.

The imaging optical lens assembly further includes an IR cut filter 160 located between the fifth lens element 150 and an image surface 170. The IR cut filter 160 is made of glass material and will not affect the focal length of the imaging optical lens assembly. The image sensor 180 is disposed on or near the image surface 170 of the imaging optical lens assembly.

The detailed optical data of the 1st embodiment are shown in TABLE 1, and the aspheric surface data are shown in TABLE 2, wherein the units of the curvature radius, the thickness and the focal length are expressed in mm, and HFOV is a half of the maximal field of view.

The equation of the aspheric surface profiles is expressed as follows:

$$X(Y) = (Y^2/R)/(1+\text{sqrt}(1 - (1+k)*(Y/R)^2)) + \sum_i (Ai)*(Y^i)$$

where:
X is the relative distance between a point on the aspheric surface spaced at a distance Y from the optical axis and the tangential plane at the aspheric surface vertex on the optical axis;
Y is the vertical distance from the point on the aspheric surface profile to the optical axis;
R is the curvature radius;
k is the conic coefficient; and
Ai is the i-th aspheric coefficient.

In the 1st embodiment, a focal length of the imaging optical lens assembly is f, an f-number of the imaging optical lens assembly is Fno, half of a maximal field of view

TABLE 1

(1st Embodiment)
f = 1.73 mm, Fno = 2.40, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.390 | ASP | 0.322 | Plastic | 1.544 | 56.0 | −4.09 |
| 2 | | 33.500 | ASP | 0.866 | | | | |
| 3 | Ape. Stop | Plano | | 0.025 | | | | |
| 4 | Lens 2 | 5.069 | ASP | 0.758 | Plastic | 1.544 | 56.0 | 1.57 |
| 5 | | −0.975 | ASP | 0.035 | | | | |
| 6 | Lens 3 | 2.966 | ASP | 0.250 | Plastic | 1.639 | 23.5 | −3.81 |
| 7 | | 1.294 | ASP | 0.256 | | | | |
| 8 | Lens 4 | 31.143 | ASP | 1.167 | Plastic | 1.544 | 56.0 | 1.54 |
| 9 | | −0.850 | ASP | 0.025 | | | | |
| 10 | Lens 5 | 1.986 | ASP | 0.367 | Plastic | 1.639 | 23.5 | −1.61 |
| 11 | | 0.627 | ASP | 0.450 | | | | |
| 12 | IR Cut Filter | Plano | | 0.210 | Glass | 1.517 | 64.2 | — |
| 13 | | Plano | | 0.341 | | | | |
| 14 | Image Surface | Plano | | — | | | | |

Note:
Reference wavelength is d-line 587.6 nm

TABLE 2

Aspheric Coefficients

| Surface # | 1 | 2 | 4 | 5 | 6 |
|---|---|---|---|---|---|
| k = | −2.8974E+01 | −9.0000E+01 | 2.0000E+01 | −1.0489E+00 | −3.2310E+00 |
| A4 = | 3.1043E−01 | 6.4676E−01 | −1.5578E−01 | −1.3947E−01 | −4.9211E−01 |
| A6 = | −2.3973E−01 | −3.2653E−01 | 7.6228E−02 | 3.7766E−01 | 8.6023E−01 |
| A8 = | 1.4241E−01 | 1.3540E−01 | −2.1009E+00 | −1.7999E+00 | −1.3116E+00 |
| A10 = | −4.7154E−02 | 2.4251E−01 | 2.2957E+00 | 2.5419E+00 | 9.4826E−01 |
| A12 = | 5.9825E−03 | | | −2.1013E+00 | −2.3163E−01 |

| Surface # | 7 | 8 | 9 | 10 | 11 |
|---|---|---|---|---|---|
| k = | −1.4561E+00 | −2.6496E+00 | −9.4934E−01 | −3.4941E+01 | −4.2829E+00 |
| A4 = | −4.4621E−01 | 1.6206E−01 | 4.6484E−01 | −2.8103E−01 | −2.4891E−01 |
| A6 = | 6.9001E−01 | −2.3409E−01 | −7.1292E−01 | −6.5565E−02 | 1.9219E−01 |
| A8 = | −7.9982E−01 | 2.5223E−01 | 7.4111E−01 | 1.0830E−01 | −1.1130E−01 |
| A10 = | 5.8009E−01 | −1.7510E−01 | −4.5911E−01 | −4.2813E−02 | 4.2945E−02 |
| A12 = | −2.2847E−01 | 7.4175E−02 | 1.5600E−01 | 1.2329E−02 | −1.0603E−02 |
| A14 = | 3.5977E−02 | −1.6475E−02 | −2.1395E−02 | −1.8523E−03 | 1.5050E−03 |
| A16 = | | 1.3637E−03 | | | −9.1039E−05 | of the imaging optical lens assembly is HFOV, and these parameters have the following values: f=1.73 mm; Fno=2.40; and HFOV=70.0 degrees.

In the 1st embodiment, an Abbe number of the fifth lens element 150 is V5, and it satisfies the condition: V5=23.5.

In the 1st embodiment, an Abbe number of the third lens element 130 is V3, an Abbe number of the fourth lens element 140 is V4, the Abbe number of the fifth lens element 150 is V5, and they satisfy the condition: (V3+V5)/V4=0.84.

In the 1st embodiment, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and they satisfy the condition: (T23+T34+T45)/T12=0.35.

In the 1st embodiment, a curvature radius of an object-side surface 111 of the first lens element 110 is R1, the focal length of the imaging optical lens assembly is f, and they satisfy the condition: R1/f=−1.38.

In the 1st embodiment, a curvature radius of an object-side surface 121 of the second lens element 120 is R3, a curvature radius of the image-side surface 122 of the second lens element 120 is R4, and they satisfy the condition: |R4/R3|=0.19.

In the 1st embodiment, a focal length of the third lens element 130 is f3, a focal length of the fourth lens element 140 is f4, and they satisfy the condition: |f4/f3|=0.40.

In the 1st embodiment, a focal length of the first lens element 110 is f1, the focal length of the third lens element 130 is f3, and they satisfy the condition: f1/f3=1.07.

In the 1st embodiment, the focal length of the third lens element 130 is f3, a focal length of the fifth lens element 150 is f5, and they satisfy the condition: f5/f3=0.42.

In the 1st embodiment, a vertical distance between a maximum effective diameter position on the image-side surface 152 of the fifth lens element 150 and an optical axis is Y52, the focal length of the imaging optical lens assembly is f, and they satisfy the condition: Y52/f=1.10.

In the 1st embodiment, a projected point on an optical axis from an effective radius position on the object-side surface 111 of the first lens element 110 is closer to the image side than an axial vertex of the object-side surface 111 of the first lens element 110 on the optical axis, a vertical distance between an off-axial critical point on the object-side surface 111 of the first lens element 110 and the optical axis is Yc11, the focal length of the imaging optical lens assembly is f, and they satisfy the condition: Yc11/f=0.31.

In the 1st embodiment, the vertical distance between the off-axial critical point on the object-side surface 111 of the first lens element 110 and the optical axis is Yc11, a vertical distance between an off-axial critical point on the image-side surface 152 of the fifth lens element 150 and the optical axis is Yc52, and they satisfy the condition: Yc11/Yc52=0.47.

In the 1st embodiment, a maximum image height of the imaging optical lens assembly is ImgH, the focal length of the imaging optical lens assembly is f, and they satisfy the condition: ImgH/f=1.35.

In the 1st embodiment, an axial distance between the object-side surface 111 of the first lens element 110 and the image surface 170 is TL, the maximum image height of the imaging optical lens assembly is ImgH, and they satisfy the condition: TL/ImgH=2.17.

In the 1st embodiment, an axial distance between the image-side surface 152 of the fifth lens element 150 and the image surface 170 is BL, the maximum image height of the imaging optical lens assembly is ImgH, and they satisfy the condition: BL/ImgH=0.43.

In the 1st embodiment, half of the maximal field of view of the imaging optical lens assembly is HFOV, and it satisfies the condition: tan(HFOV)=2.75.

2nd Embodiment

Figure 2A:
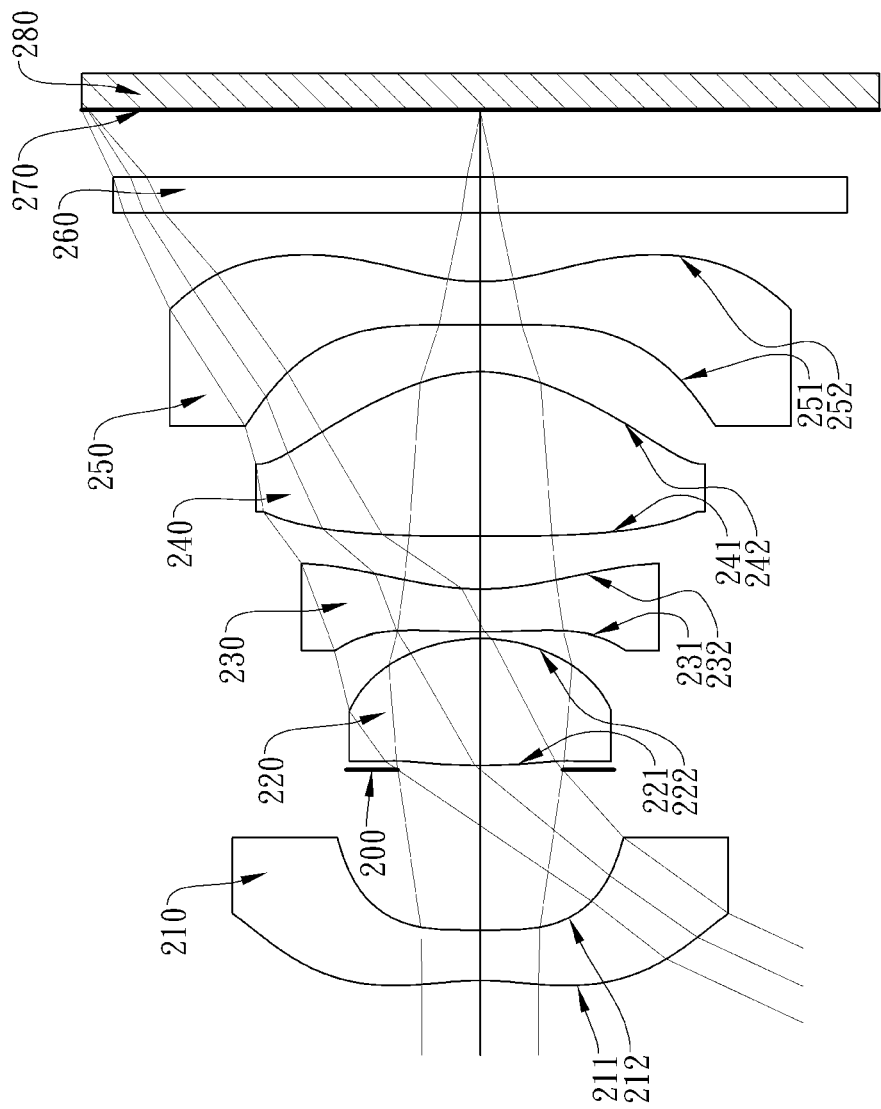
FIG. 2A is a schematic view of an image capturing apparatus according to the 2nd embodiment of the present disclosure.
Figure 2B:
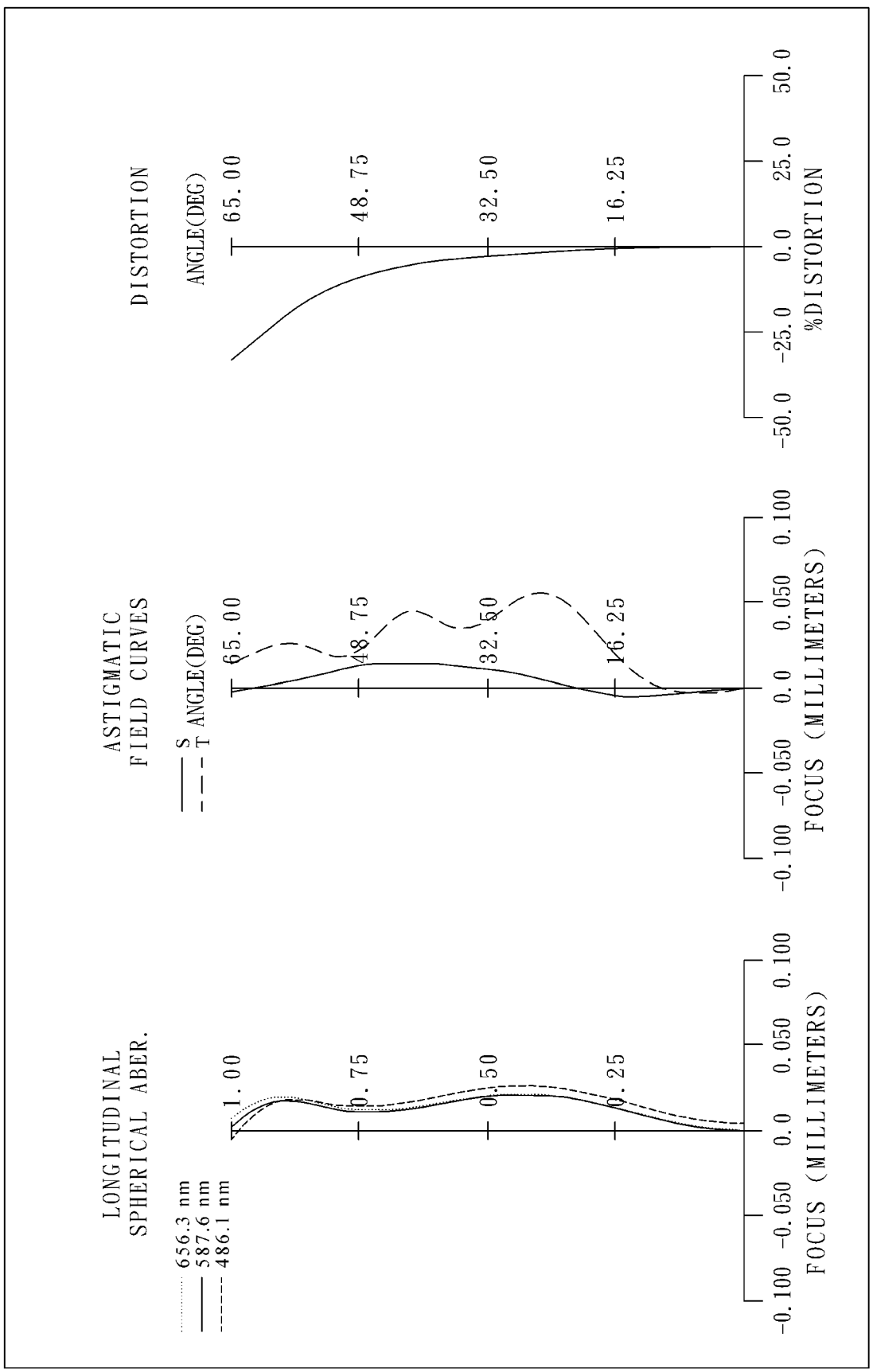
FIG. 2B shows longitudinal spherical aberration curves, astigmatic field curves and a distortion curve of the image capturing apparatus according to the 2nd embodiment.

FIG. 2A is a schematic view of an image capturing apparatus according to the 2nd embodiment of the present disclosure. FIG. 2B shows, in order from left to right, longitudinal spherical aberration curves, astigmatic field curves and a distortion curve of the image capturing apparatus according to the 2nd embodiment.

In FIG. 2A, the image capturing apparatus includes an imaging optical lens assembly (not otherwise herein labeled) of the present disclosure and an image sensor 280. The imaging optical lens assembly includes, in order from an object side to an image side, a first lens element 210, an aperture stop 200, a second lens element 220, a third lens element 230, a fourth lens element 240, and a fifth lens element 250.

The first lens element 210 with negative refractive power has an object-side surface 211 being concave in a paraxial region thereof and an image-side surface 212 being concave in a paraxial region thereof, which are both aspheric, and at least a convex shape in an off-axial region on the object-side surface 211. The first lens element 210 is made of plastic material.

The second lens element 220 with positive refractive power has an object-side surface 221 being convex in a paraxial region thereof and an image-side surface 222 being convex in a paraxial region thereof, which are both aspheric, and the second lens element 220 is made of plastic material.

The third lens element 230 with negative refractive power has an object-side surface 231 being convex in a paraxial region thereof and an image-side surface 232 being concave in a paraxial region thereof, which are both aspheric, and the third lens element 230 is made of plastic material.

The fourth lens element 240 with positive refractive power has an object-side surface 241 being convex in a paraxial region thereof and an image-side surface 242 being convex in a paraxial region thereof, which are both aspheric, and the fourth lens element 240 is made of plastic material.

The fifth lens element 250 with negative refractive power has an object-side surface 251 being concave in a paraxial region thereof and an image-side surface 252 being concave in a paraxial region thereof, which are both aspheric, and at least a convex shape in an off-axial region on the image-side surface 252. The fifth lens element 250 is made of plastic material.

The imaging optical lens assembly further includes an IR cut filter 260 located between the fifth lens element 250 and an image surface 270. The IR cut filter 260 is made of glass material and will not affect the focal length of the imaging optical lens assembly. The image sensor 280 is disposed on or near the image surface 270 of the imaging optical lens assembly.

The detailed optical data of the 2nd embodiment are shown in TABLE 3, and the aspheric surface data are shown in TABLE 4, wherein the units of the curvature radius, the thickness and the focal length are expressed in mm, and HFOV is half of the maximal field of view.

TABLE 3

(2nd Embodiment)
f = 1.62 mm, Fno = 2.40, HFOV = 65.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.771 | ASP | 0.293 | Plastic | 1.544 | 56.0 | −2.87 |
| 2 | | 13.891 | ASP | 0.935 | | | | |
| 3 | Ape. Stop | Plano | | 0.025 | | | | |
| 4 | Lens 2 | 3.274 | ASP | 0.739 | Plastic | 1.544 | 56.0 | 1.50 |
| 5 | | −1.004 | ASP | 0.035 | | | | |
| 6 | Lens 3 | 4.001 | ASP | 0.250 | Plastic | 1.639 | 23.5 | −3.69 |
| 7 | | 1.446 | ASP | 0.306 | | | | |
| 8 | Lens 4 | 20.092 | ASP | 0.960 | Plastic | 1.544 | 56.0 | 1.57 |
| 9 | | −0.876 | ASP | 0.275 | | | | |
| 10 | Lens 5 | −28.409 | ASP | 0.250 | Plastic | 1.660 | 20.4 | −1.65 |
| 11 | | 1.138 | ASP | 0.400 | | | | |
| 12 | IR Cut Filter | Plano | | 0.210 | Glass | 1.517 | 64.2 | — |
| 13 | | Plano | | 0.390 | | | | |
| 14 | Image Surface | Plano | | — | | | | |

Note:
Reference wavelength is d-line 587.6 nm

TABLE 4

Aspheric Coefficients

| Surface # | 1 | 2 | 4 | 5 | 6 |
|---|---|---|---|---|---|
| k = | −2.8974E+01 | −9.0000E+01 | 2.0000E+01 | −1.0267E+00 | −3.2310E+00 |
| A4 = | 4.2260E−01 | 1.1051E+00 | −1.4398E−01 | −4.2553E−02 | −4.8896E−01 |
| A6 = | −3.7664E−01 | −1.2315E+00 | −4.5134E−01 | −1.5018E+00 | 4.0638E−01 |
| A8 = | 2.4768E−01 | 2.5216E+00 | 6.3744E−01 | 9.3643E+00 | 3.9971E−01 |
| A10 = | −8.8064E−02 | −3.1120E+00 | −4.3465E+00 | −3.1953E+01 | −3.1843E+00 |
| A12 = | 1.1863E−02 | 2.7825E+00 | | 5.0340E+01 | 4.0319E+00 |
| A14 = | | | | −3.1887E+01 | −1.4433E+00 |

| Surface # | 7 | 8 | 9 | 10 | 11 |
|---|---|---|---|---|---|
| k = | −1.4627E+00 | −2.6496E+00 | −9.9633E−01 | −3.4941E+01 | −4.2829E+00 |
| A4 = | −4.2775E−01 | 3.6771E−02 | 4.8098E−01 | 2.5978E−02 | −2.5135E−01 |
| A6 = | 6.6050E−01 | 2.3640E−03 | −8.4899E−01 | −6.4299E−01 | 1.4552E−01 |
| A8 = | −8.2360E−01 | −1.5848E−02 | 1.0790E+00 | 8.6518E−01 | −4.9814E−02 |
| A10 = | 5.9612E−01 | 2.0829E−02 | −8.1088E−01 | −5.6759E−01 | 7.6735E−03 |
| A12 = | −2.0891E−01 | −1.1957E−02 | 3.2182E−01 | 1.7882E−01 | −1.8407E−04 |
| A14 = | 2.2082E−02 | 4.9734E−03 | −5.0021E−02 | −2.1116E−02 | −8.2045E−05 |
| A16 = | | −1.0457E−03 | | | 8.2897E−06 |

In the 2nd embodiment, the equation of the aspheric surface profiles of the aforementioned lens elements is the same as the equation of the 1st embodiment. Also, the definitions of these parameters shown in TABLE 5 below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in TABLE 5.

TABLE 5

2nd Embodiment

| f [mm] | 1.62 | f1/f3 | 0.78 |
|---|---|---|---|
| Fno | 2.40 | f5/f3 | 0.45 |
| HFOV [deg.] | 65.0 | Y52/f | 1.11 |
| V5 | 20.4 | Yc11/f | 0.31 |
| (V3 + V5)/V4 | 0.78 | Yc11/Yc52 | 0.49 |
| (T23 + T34 + T45)/T12 | 0.64 | ImgH/f | 1.41 |

TABLE 5-continued

2nd Embodiment

| R1/f | −1.09 | TL/ImgH | 2.22 |
|---|---|---|---|
| |R4/R3| | 0.31 | BL/ImgH | 0.44 |
| |f4/f3| | 0.43 | tan(HFOV) | 2.14 |

3rd Embodiment

Figure 3A:
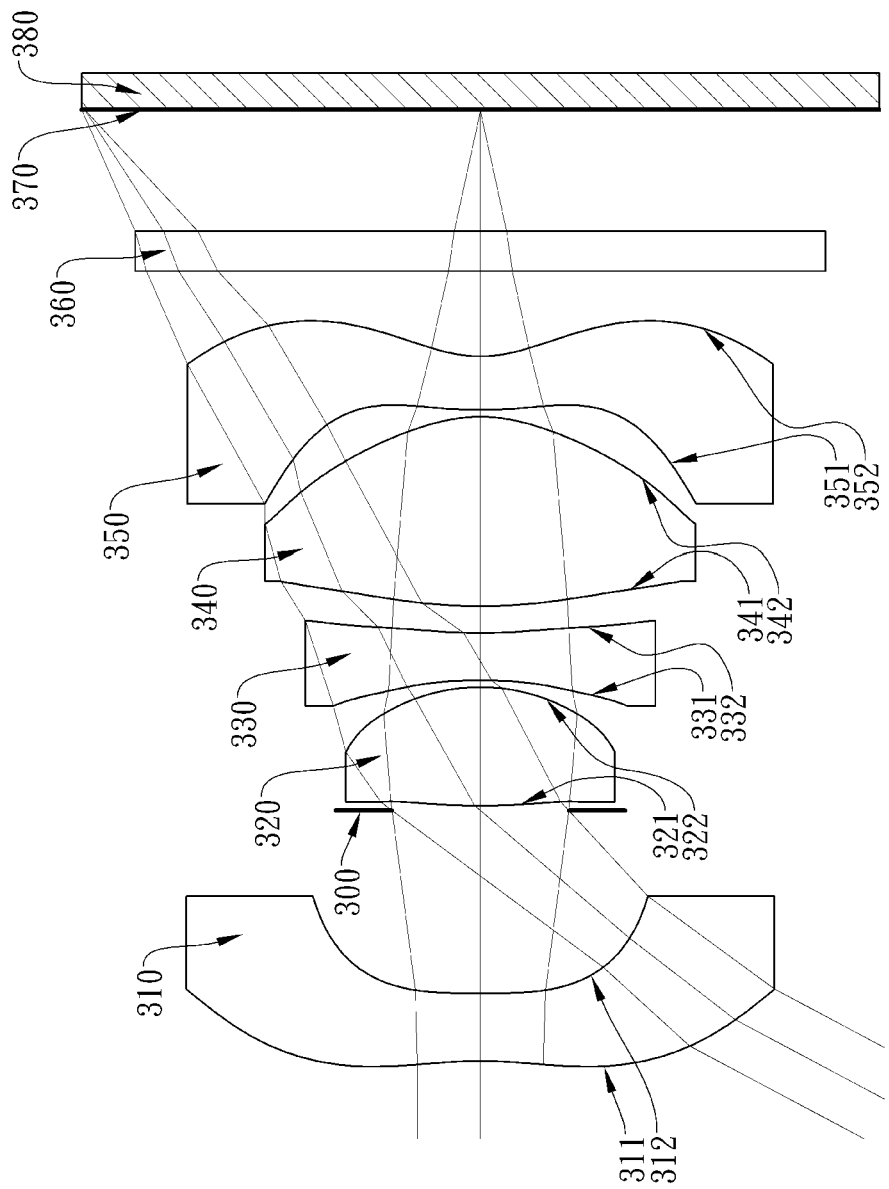
FIG. 3A is a schematic view of an image capturing apparatus according to the 3rd embodiment of the present disclosure.
Figure 3B:
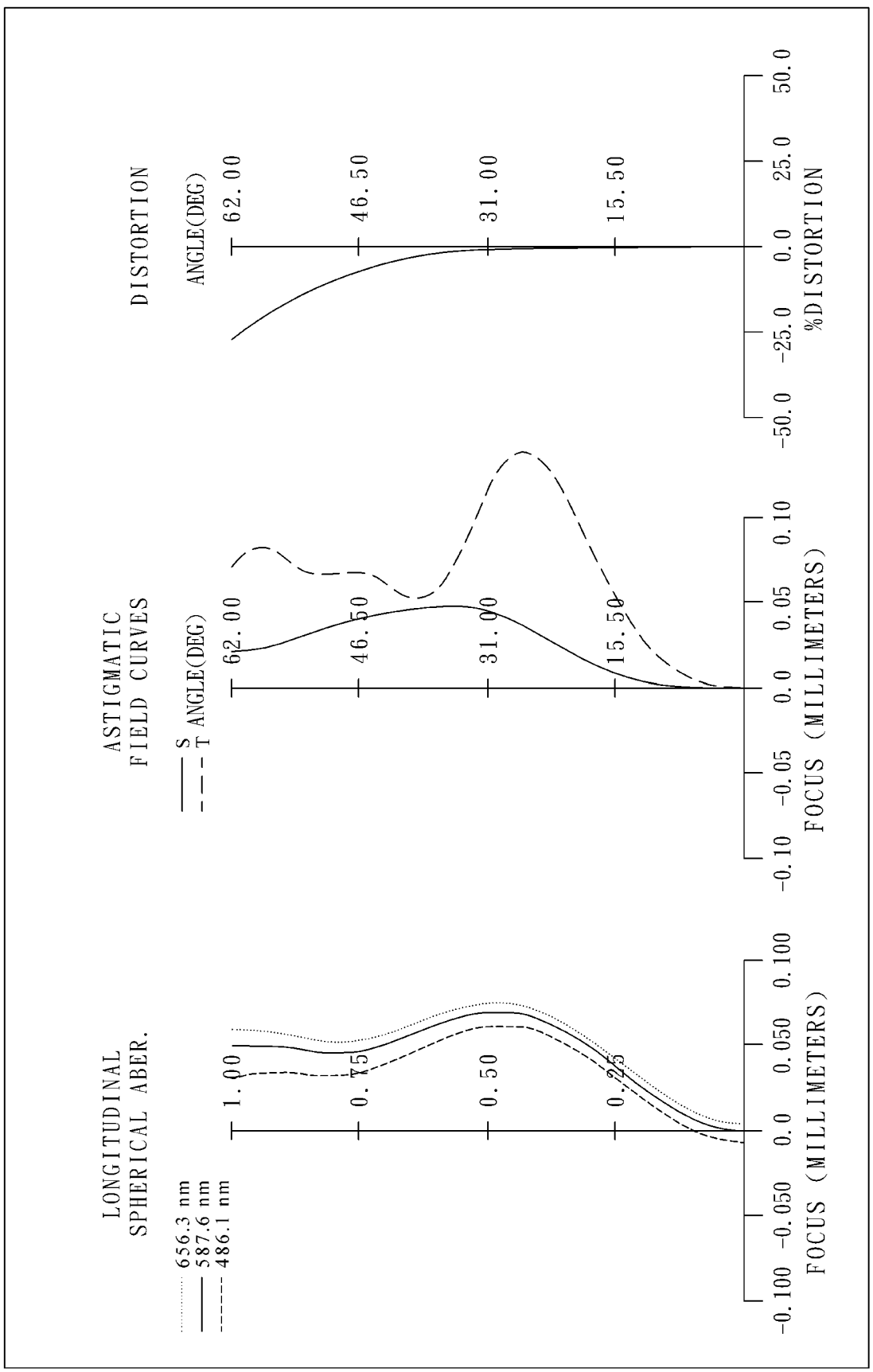
FIG. 3B shows longitudinal spherical aberration curves, astigmatic field curves and a distortion curve of the image capturing apparatus according to the 3rd embodiment.

FIG. 3A is a schematic view of an image capturing apparatus according to the 3rd embodiment of the present disclosure. FIG. 3B shows, in order from left to right, longitudinal spherical aberration curves, astigmatic field curves and a distortion curve of the image capturing apparatus according to the 3rd embodiment.

In FIG. 3A, the image capturing apparatus includes an imaging optical lens assembly (not otherwise herein labeled) of the present disclosure and an image sensor 380. The imaging optical lens assembly includes, in order from an object side to an image side, a first lens element 310, an aperture stop 300, a second lens element 320, a third lens element 330, a fourth lens element 340, and a fifth lens element 350.

The first lens element 310 with negative refractive power has an object-side surface 311 being concave in a paraxial region thereof and an image-side surface 312 being concave in a paraxial region thereof, which are both aspheric, and at least one convex shape in an off-axial region on the object-side surface 311. The first lens element 310 is made of plastic material.

The second lens element 320 with positive refractive power has an object-side surface 321 being convex in a paraxial region thereof and an image-side surface 322 being convex in a paraxial region thereof, which are both aspheric, and the second lens element 320 is made of plastic material.

The third lens element 330 with negative refractive power has an object-side surface 331 being concave in a paraxial region thereof and an image-side surface 332 being concave in a paraxial region thereof, which are both aspheric, and the third lens element 330 is made of plastic material.

The fourth lens element 340 with positive refractive power has an object-side surface 341 being convex in a paraxial region thereof and an image-side surface 342 being convex in a paraxial region thereof, which are both aspheric, and the fourth lens element 340 is made of plastic material.

The fifth lens element 350 with negative refractive power has an object-side surface 351 being convex in a paraxial region thereof and an image-side surface 352 being concave in a paraxial region thereof, which are both aspheric, and at least one convex shape in an off-axial region on the image-side surface 352. The fifth lens element 350 is made of plastic material.

The imaging optical lens assembly further includes an IR cut filter 360 located between the fifth lens element 350 and an image surface 370. The IR cut filter 360 is made of glass material and will not affect the focal length of the imaging optical lens assembly. The image sensor 380 is disposed on or near the image surface 370 of the imaging optical lens assembly.

The detailed optical data of the 3rd embodiment are shown in TABLE 6, and the aspheric surface data are shown in TABLE 7, wherein the units of the curvature radius, the thickness and the focal length are expressed in mm, and HFOV is half of the maximal field of view.

TABLE 6

(3rd Embodiment)
f = 1.53 mm, Fno = 2.30, HFOV = 62.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.154 | ASP | 0.355 | Plastic | 1.535 | 55.8 | −3.02 |
| 2 | | 6.814 | ASP | 0.967 | | | | |
| 3 | Ape. Stop | Plano | | 0.025 | | | | |
| 4 | Lens 2 | 3.138 | ASP | 0.626 | Plastic | 1.544 | 56.0 | 1.52 |
| 5 | | −1.043 | ASP | 0.035 | | | | |
| 6 | Lens 3 | −3.893 | ASP | 0.250 | Plastic | 1.535 | 55.8 | −2.55 |
| 7 | | 2.144 | ASP | 0.142 | | | | |
| 8 | Lens 4 | 2.656 | ASP | 0.997 | Plastic | 1.535 | 55.8 | 1.27 |
| 9 | | −0.795 | ASP | 0.035 | | | | |
| 10 | Lens 5 | 1.977 | ASP | 0.283 | Plastic | 1.660 | 20.4 | −1.59 |
| 11 | | 0.647 | ASP | 0.450 | | | | |
| 12 | IR Cut Filter | Plano | | 0.210 | Glass | 1.517 | 64.2 | — |
| 13 | | Plano | | 0.643 | | | | |
| 14 | Image Surface | Plano | | — | | | | |

Note:
Reference wavelength is d-line 587.6 nm

TABLE 7

Aspheric Coefficients

| Surface # | 1 | 2 | 4 | 5 | 6 |
|---|---|---|---|---|---|
| k = | −2.8974E+01 | −9.0000E+01 | 2.0000E+01 | −1.1003E+00 | −3.2310E+00 |
| A4 = | 2.9643E−01 | 7.6545E−01 | −2.7076E−01 | −4.2096E−01 | −1.2722E+00 |
| A6 = | −2.1472E−01 | −6.1991E−01 | −3.0990E−01 | −1.6826E−01 | 5.4884E+00 |
| A8 = | 1.0880E−01 | 1.1538E+00 | 6.6040E−01 | 1.3207E+01 | −1.0259E+01 |
| A10 = | −2.8884E−02 | −1.4394E+00 | −6.8350E−01 | −6.2038E+01 | 8.8313E+00 |
| A12 = | 2.8959E−03 | 1.2542E+00 | | 1.1287E+02 | −3.3043E+00 |
| A14 = | | | | −8.0175E+01 | 4.0348E−01 |

| Surface # | 7 | 8 | 9 | 10 | 11 |
|---|---|---|---|---|---|
| k = | −1.9457E−01 | −2.6496E+00 | −9.3538E−01 | −3.4941E+01 | −4.2829E+00 |
| A4 = | −7.8879E−01 | −4.2643E−02 | 8.8807E−01 | −1.0295E−01 | −3.7312E−01 |
| A6 = | 1.5941E+00 | −6.2078E−02 | −2.2363E+00 | −1.3177E+00 | 2.5760E−01 |
| A8 = | −1.6685E+00 | 4.4639E−02 | 3.6782E+00 | 2.3456E+00 | −1.0807E−01 |

TABLE 7-continued

| Aspheric Coefficients | | | | | |
|---|---|---|---|---|---|
| A10 = | 1.0163E+00 | 1.5325E−02 | −3.5168E+00 | −2.1004E+00 | 8.7430E−03 |
| A12 = | −4.0366E−01 | −1.5950E−02 | 1.7078E+00 | 9.3280E−01 | 1.3967E−02 |
| A14 = | 7.6169E−02 | 4.2082E−03 | −3.1910E−01 | −1.5584E−01 | −6.1205E−03 |
| A16 = | | −4.5570E−04 | | | 8.0890E−04 |

In the 3rd embodiment, the equation of the aspheric surface profiles of the aforementioned lens elements is the same as the equation of the 1st embodiment. Also, the definitions of these parameters shown in TABLE 8 below are the same as those stated in the 1st embodiment with corresponding values for the 3rd embodiment, so an explanation in this regard will not be provided again.

Moreover, these parameters can be calculated from TABLE 6 and TABLE 7 and satisfy the conditions stated in TABLE 8.

TABLE 8

| 3rd Embodiment | | | |
|---|---|---|---|
| f [mm] | 1.53 | f1/f3 | 1.18 |
| Fno | 2.30 | f5/f3 | 0.63 |
| HFOV [deg.] | 62.0 | Y52/f | 1.01 |
| V5 | 20.4 | Yc11/f | 0.37 |
| (V3 + V5)/V4 | 1.37 | Yc11/Yc52 | 0.63 |
| (T23 + T34 + T45)/T12 | 0.21 | ImgH/f | 1.37 |
| R1/f | −1.41 | TL/ImgH | 2.40 |
| \|R4/R3\| | 0.33 | BL/ImgH | 0.62 |
| \|f4/f3\| | 0.50 | tan(HFOV) | 1.88 |

4th Embodiment

Figure 4A:
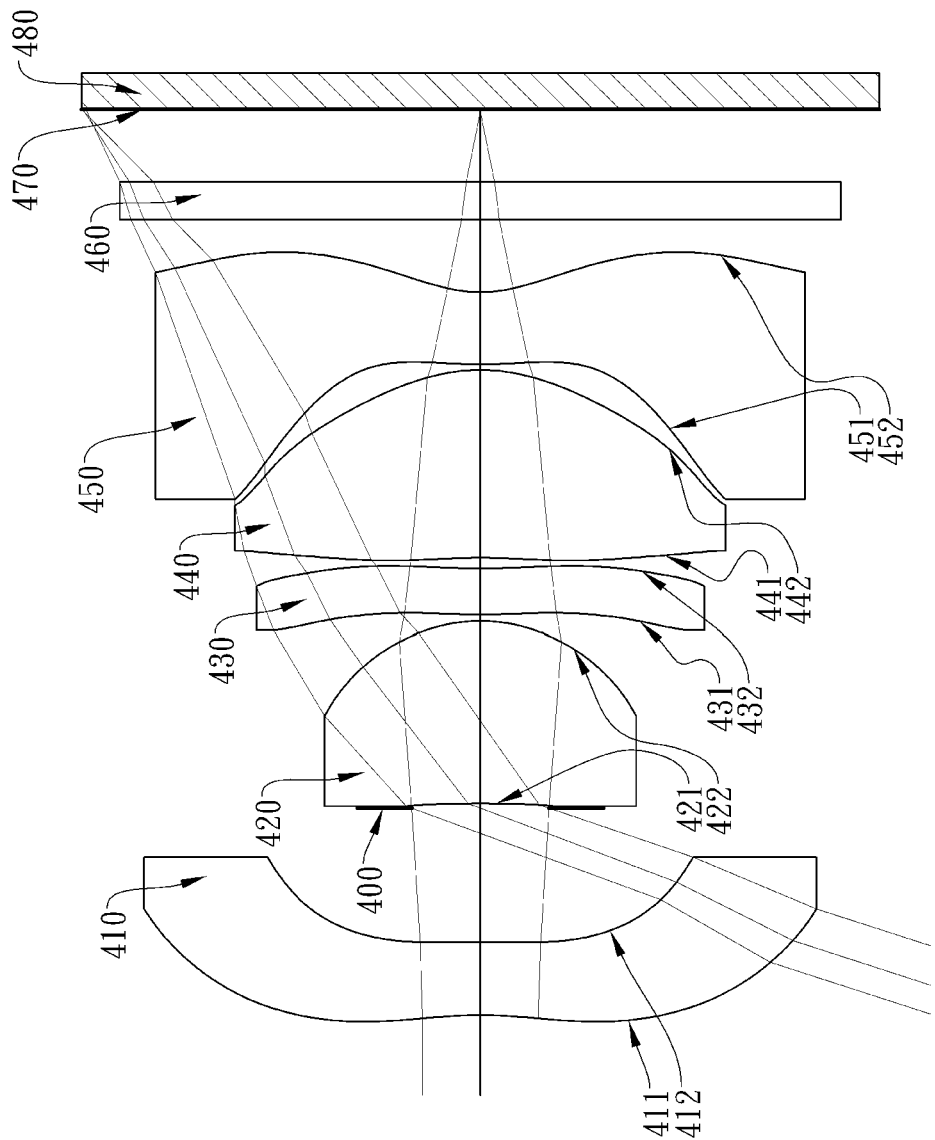
FIG. 4A is a schematic view of an image capturing apparatus according to the 4th embodiment of the present disclosure.
Figure 4B:
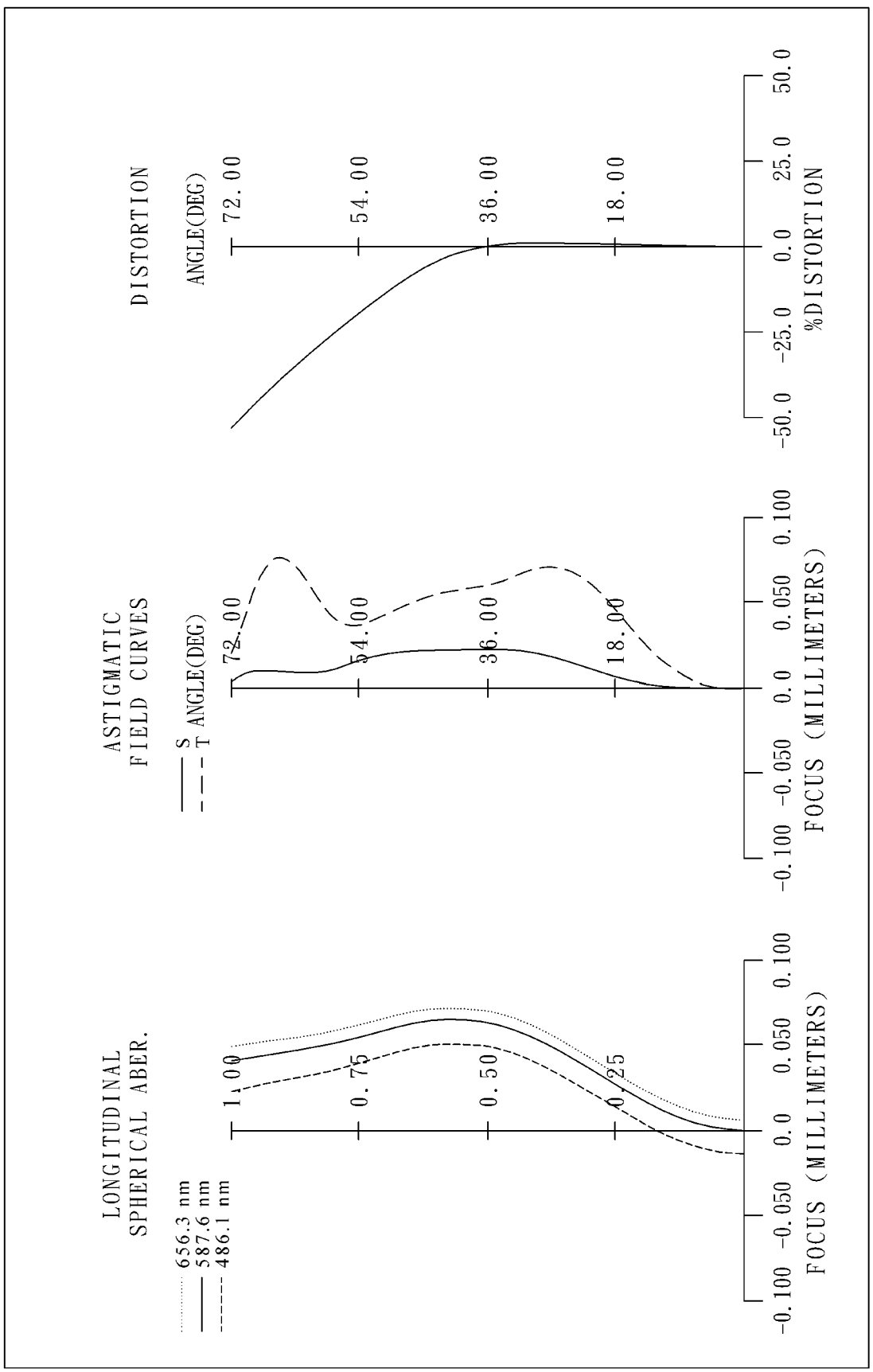
FIG. 4B shows longitudinal spherical aberration curves, astigmatic field curves and a distortion curve of the image capturing apparatus according to the 4th embodiment.

FIG. 4A is a schematic view of an image capturing apparatus according to the 4th embodiment of the present disclosure. FIG. 4B shows, in order from left to right, longitudinal spherical aberration curves, astigmatic field curves and a distortion curve of the image capturing apparatus according to the 4th embodiment.

In FIG. 4A, the image capturing apparatus includes an imaging optical lens assembly (not otherwise herein labeled) of the present disclosure and an image sensor 480. The imaging optical lens assembly includes, in order from an object side to an image side, a first lens element 410, an aperture stop 400, a second lens element 420, a third lens element 430, a fourth lens element 440, and a fifth lens element 450.

The first lens element 410 with negative refractive power has an object-side surface 411 being concave in a paraxial region thereof and an image-side surface 412 being convex in a paraxial region thereof, which are both aspheric, and at least one convex shape in an off-axial region on the object-side surface 411. The first lens element 410 is made of plastic material.

The second lens element 420 with positive refractive power has an object-side surface 421 being concave in a paraxial region thereof and an image-side surface 422 being convex in a paraxial region thereof, which are both aspheric, and the second lens element 420 is made of plastic material.

The third lens element 430 with negative refractive power has an object-side surface 431 being convex in a paraxial region thereof and an image-side surface 432 being concave in a paraxial region thereof, which are both aspheric, and the third lens element 430 is made of plastic material.

The fourth lens element 440 with positive refractive power has an object-side surface 441 being concave in a paraxial region thereof and an image-side surface 442 being convex in a paraxial region thereof, which are both aspheric, and the fourth lens element 440 is made of plastic material.

The fifth lens element 450 with negative refractive power has an object-side surface 451 being convex in a paraxial region thereof and an image-side surface 452 being concave in a paraxial region thereof, which are both aspheric, and at least one convex shape in an off-axial region on the image-side surface 452. The fifth lens element 450 is made of plastic material.

The imaging optical lens assembly further includes an IR cut filter 460 located between the fifth lens element 450 and an image surface 470. The IR cut filter 460 is made of glass material and will not affect the focal length of the imaging optical lens assembly. The image sensor 480 is disposed on or near the image surface 470 of the imaging optical lens assembly.

The detailed optical data of the 4th embodiment are shown in TABLE 9, and the aspheric surface data are shown in TABLE 10, wherein the units of the curvature radius, the thickness and the focal length are expressed in mm, and HFOV is half of the maximal field of view.

TABLE 9

(4th Embodiment)
f = 1.60 mm, Fno = 2.50, HFOV = 72.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.283 | ASP | 0.405 | Plastic | 1.544 | 56.0 | −6.06 |
| 2 | | −7.881 | ASP | 0.741 | | | | |
| 3 | Ape. Stop | Plano | | 0.025 | | | | |
| 4 | Lens 2 | −14.930 | ASP | 1.010 | Plastic | 1.544 | 56.0 | 1.70 |
| 5 | | −0.891 | ASP | 0.035 | | | | |
| 6 | Lens 3 | 3.829 | ASP | 0.255 | Plastic | 1.544 | 56.0 | −150.99 |
| 7 | | 3.572 | ASP | 0.059 | | | | |
| 8 | Lens 4 | −3.378 | ASP | 1.042 | Plastic | 1.544 | 56.0 | 2.09 |

TABLE 9-continued (4th Embodiment)
f = 1.60 mm, Fno = 2.50, HFOV = 72.0 deg.

| Surface # | | Curvature Radius | | Thickness | Material | Index | Abbe # | Focal Length |
|---|---|---|---|---|---|---|---|---|
| 9 | | −0.943 | ASP | 0.030 | | | | |
| 10 | Lens 5 | 2.589 | ASP | 0.400 | Plastic | 1.639 | 23.5 | −1.68 |
| 11 | | 0.712 | ASP | 0.400 | | | | |
| 12 | IR Cut Filter | Plano | | 0.210 | Glass | 1.517 | 64.2 | — |
| 13 | | Plano | | 0.402 | | | | |
| 14 | Image Surface | Plano | | — | | | | |

Note:
Reference wavelength is d-line 587.6 nm

TABLE 10

Aspheric Coefficients

| Surface # | 1 | 2 | 4 | 5 | 6 |
|---|---|---|---|---|---|
| k = | −2.8974E+01 | −9.0000E+01 | 2.0000E+01 | −1.1663E+00 | −3.2318E+00 |
| A4 = | 2.1570E−01 | 5.2923E−01 | −4.6631E−01 | −2.5438E−02 | −5.9278E−01 |
| A6 = | −1.4042E−01 | −5.1436E−01 | 3.8403E+00 | −3.5449E−01 | 9.8664E−01 |
| A8 = | 6.0685E−02 | 3.4938E−01 | −2.6371E+01 | 7.8638E−01 | −1.0129E+00 |
| A10 = | −1.3646E−02 | −7.8551E−02 | 5.4745E+01 | −1.4013E+00 | 5.4320E−01 |
| A12 = | 1.2652E−03 | | | 6.8921E−01 | −1.1130E−01 |

| Surface # | 7 | 8 | 9 | 10 | 11 |
|---|---|---|---|---|---|
| k = | −1.3377E+00 | −2.6496E+00 | −8.4194E−01 | −3.4941E+01 | −4.2830E+00 |
| A4 = | −4.9492E−01 | 4.6007E−01 | 4.4099E−01 | −4.8476E−01 | −3.4628E−01 |
| A6 = | 9.2199E−01 | −6.0187E−01 | −8.8803E−01 | −3.1608E−01 | 3.4540E−01 |
| A8 = | −1.3345E+00 | 5.4562E−01 | 1.3507E+00 | 8.6974E−01 | −2.2778E−01 |
| A10 = | 1.1721E+00 | −4.4450E−01 | −1.1362E+00 | −7.2027E−01 | 8.8577E−02 |
| A12 = | −5.2865E−01 | 2.8844E−01 | 4.5254E−01 | 2.8092E−01 | −1.8484E−02 |
| A14 = | 9.2522E−02 | −1.0877E−01 | −6.6105E−02 | −4.1792E−02 | 1.7305E−03 |
| A16 = | | 1.6610E−02 | | | −3.5480E−05 |

In the 4th embodiment, the equation of the aspheric surface profiles of the aforementioned lens elements is the same as the equation of the 1st embodiment. Also, the definitions of these parameters shown in TABLE 11 below are the same as those stated in the 1st embodiment with corresponding values for the 4th embodiment, so an explanation in this regard will not be provided again.

Moreover, these parameters can be calculated from TABLE 9 and TABLE 10 and satisfy the conditions stated in TABLE 11.

TABLE 11

4th Embodiment

| | | | |
|---|---|---|---|
| f [mm] | 1.60 | f1/f3 | 0.04 |
| Fno | 2.50 | f5/f3 | 0.01 |
| HFOV [deg.] | 72.0 | Y52/f | 1.12 |
| V5 | 23.5 | Yc11/f | 0.40 |
| (V3 + V5)/V4 | 1.42 | Yc11/Yc52 | 0.58 |
| (T23 + T34 + T45)/T12 | 0.16 | ImgH/f | 1.37 |
| R1/f | −1.42 | TL/ImgH | 2.28 |
| |R4/R3| | 0.06 | BL/ImgH | 0.46 |
| |f4/f3| | 0.01 | tan(HFOV) | 3.08 |

5th Embodiment

Figure 5A:
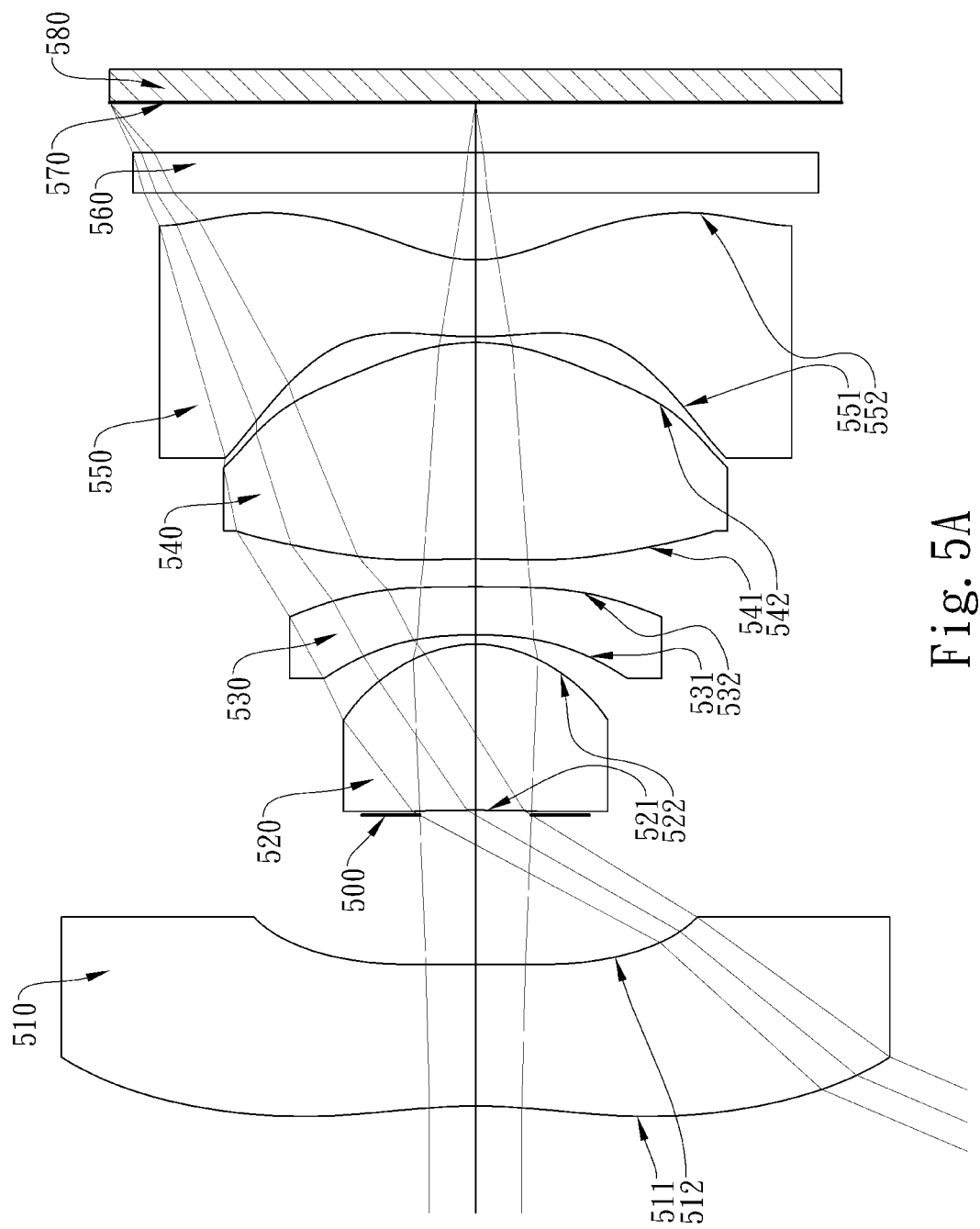
FIG. 5A is a schematic view of an image capturing apparatus according to the 5th embodiment of the present disclosure.
Figure 5B:
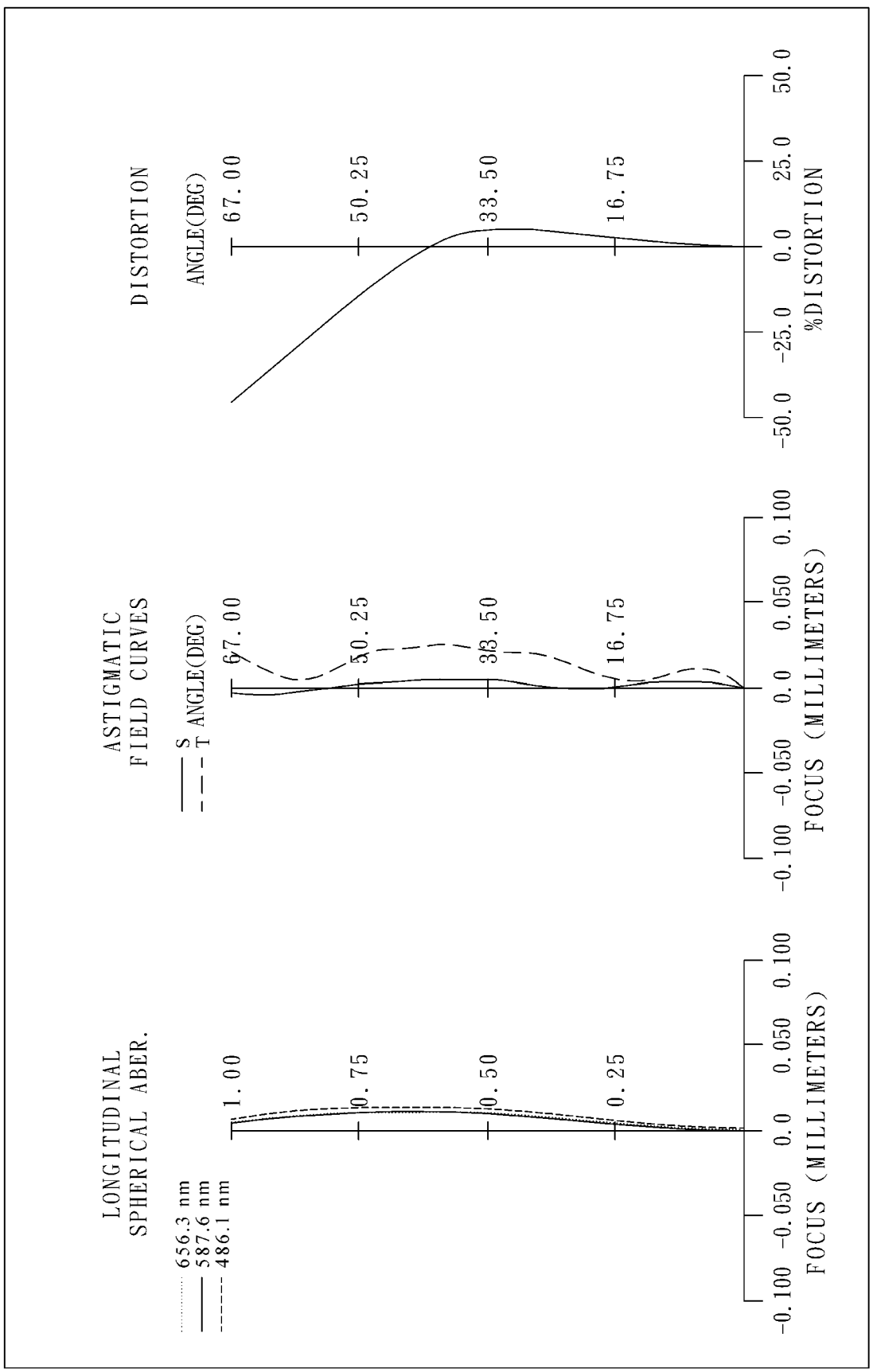
FIG. 5B shows longitudinal spherical aberration curves, astigmatic field curves and a distortion curve of the image capturing apparatus according to the 5th embodiment.

FIG. 5A is a schematic view of an image capturing apparatus according to the 5th embodiment of the present disclosure. FIG. 5B shows, in order from left to right, longitudinal spherical aberration curves, astigmatic field curves and a distortion curve of the image capturing apparatus according to the 5th embodiment.

In FIG. 5A, the image capturing apparatus includes an imaging optical lens assembly (not otherwise herein labeled) of the present disclosure and an image sensor 580. The imaging optical lens assembly includes, in order from an object side to an image side, a first lens element 510, an aperture stop 500, a second lens element 520, a third lens element 530, a fourth lens element 540, and a fifth lens element 550.

The first lens element 510 with negative refractive power has an object-side surface 511 being concave in a paraxial region thereof and an image-side surface 512 being convex in a paraxial region thereof, which are both aspheric, and at least one convex shape in an off-axial region on the object-side surface 511. The first lens element 510 is made of plastic material.

The second lens element 520 with positive refractive power has an object-side surface 521 being concave in a paraxial region thereof and an image-side surface 522 being convex in a paraxial region thereof, which are both aspheric, and the second lens element 520 is made of plastic material.

The third lens element 530 with negative refractive power has an object-side surface 531 being concave in a paraxial region thereof and an image-side surface 532 being convex in a paraxial region thereof, which are both aspheric, and the third lens element 530 is made of plastic material.

The fourth lens element 540 with positive refractive power has an object-side surface 541 being concave in a paraxial region thereof and an image-side surface 542 being convex in a paraxial region thereof, which are both aspheric, and the fourth lens element 540 is made of plastic material.

The fifth lens element 550 with negative refractive power has an object-side surface 551 being convex in a paraxial region thereof and an image-side surface 552 being concave in a paraxial region thereof, which are both aspheric, and at least one convex shape in an off-axial region on the image-side surface 552. The fifth lens element 550 is made of plastic material.

The imaging optical lens assembly further includes an IR cut filter 560 located between the fifth lens element 550 and an image surface 570. The IR cut filter 560 is made of glass material and will not affect the focal length of the imaging optical lens assembly. The image sensor 580 is disposed on or near the image surface 570 of the imaging optical lens assembly.

The detailed optical data of the 5th embodiment are shown in TABLE 12, and the aspheric surface data are shown in TABLE 13, wherein the units of the curvature radius, the thickness and the focal length are expressed in mm, and HFOV is half of the maximal field of view.

TABLE 12

(5th Embodiment)
f = 1.54 mm, Fno = 3.20, HFOV = 67.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.832 | ASP | 0.738 | Plastic | 1.544 | 56.0 | −6.71 |
| 2 | | −13.791 | ASP | 0.779 | | | | |
| 3 | Ape. Stop | Plano | | 0.025 | | | | |
| 4 | Lens 2 | −25.270 | ASP | 0.866 | Plastic | 1.544 | 56.0 | 1.27 |
| 5 | | −0.681 | ASP | 0.049 | | | | |
| 6 | Lens 3 | −2.608 | ASP | 0.250 | Plastic | 1.639 | 23.3 | −4.23 |
| 7 | | −78.431 | ASP | 0.143 | | | | |
| 8 | Lens 4 | −4.608 | ASP | 1.129 | Plastic | 1.544 | 56.0 | 2.15 |
| 9 | | −1.014 | ASP | 0.030 | | | | |
| 10 | Lens 5 | 1.865 | ASP | 0.400 | Plastic | 1.639 | 23.5 | −1.82 |
| 11 | | 0.656 | ASP | 0.350 | | | | |
| 12 | IR Cut Filter | Plano | | 0.210 | Glass | 1.517 | 64.2 | — |
| 13 | | Plano | | 0.260 | | | | |
| 14 | Image Surface | Plano | | — | | | | |

Note:
Reference wavelength is d-line 587.6 nm

TABLE 13

Aspheric Coefficients

| Surface # | 1 | 2 | 4 | 5 | 6 |
|---|---|---|---|---|---|
| k = | −2.8970E+01 | −9.0000E+01 | 2.0000E+01 | −1.0602E+00 | −3.2323E+00 |
| A4 = | 8.9572E−02 | 2.8570E−01 | −3.1521E−01 | −1.5742E−01 | −7.7631E−01 |
| A6 = | −3.6241E−02 | −1.8245E−01 | 8.9534E−01 | 8.6128E−01 | 1.6980E+00 |
| A8 = | 8.3481E−03 | 4.8565E−02 | −1.5034E+01 | −4.4670E+00 | −2.3234E+00 |
| A10 = | −9.5136E−04 | 1.4638E−02 | 4.4048E+01 | 8.0318E+00 | 1.6635E+00 |
| A12 = | 4.4000E−05 | | | −6.5731E+00 | −4.5290E−01 |

| Surface # | 7 | 8 | 9 | 10 | 11 |
|---|---|---|---|---|---|
| k = | −9.0000E+01 | −2.6490E+00 | −8.3138E−01 | −3.4939E+01 | −4.2832E+00 |
| A4 = | −3.8097E−01 | 7.1968E−01 | 1.8753E−01 | −5.1420E−01 | −2.2336E−01 |
| A6 = | 4.3033E−01 | −1.3337E+00 | 2.0811E−01 | −1.2468E−01 | 2.7822E−02 |
| A8 = | −5.0416E−01 | 1.5667E+00 | −2.9700E−01 | 5.2118E−01 | 1.6968E−01 |
| A10 = | 5.7838E−01 | −1.2131E+00 | 2.9368E−02 | −4.0090E−01 | −1.9413E−01 |
| A12 = | −3.7622E−01 | 5.9313E−01 | 5.3051E−02 | 1.3838E−01 | 9.5194E−02 |
| A14 = | 8.8702E−02 | −1.6241E−01 | −1.2668E−02 | −1.7324E−02 | −2.2143E−02 |
| A16 = | | 1.8708E−02 | | | 2.0000E−03 |

In the 5th embodiment, the equation of the aspheric surface profiles of the aforementioned lens elements is the same as the equation of the 1st embodiment. Also, the definitions of these parameters shown in TABLE 14 below are the same as those stated in the 1st embodiment with corresponding values for the 5th embodiment, so an explanation in this regard will not be provided again.

Moreover, these parameters can be calculated from TABLE 12 and TABLE 13 and satisfy the conditions stated in TABLE 14.

TABLE 14

| 5th Embodiment | | | |
|---|---|---|---|
| f [mm] | 1.54 | f1/f3 | 1.59 |
| Fno | 3.20 | f5/f3 | 0.43 |
| HFOV [deg.] | 67.0 | Y52/f | 1.07 |
| V5 | 23.5 | Yc11/f | 0.58 |
| (V3 + V5)/V4 | 0.84 | Yc11/Yc52 | 0.83 |
| (T23 + T34 + T45)/T12 | 0.28 | ImgH/f | 1.24 |
| R1/f | −1.84 | TL/ImgH | 2.74 |
| |R4/R3| | 0.03 | BL/ImgH | 0.43 |
| |f4/f3| | 0.51 | tan(HFOV) | 2.36 |

6th Embodiment

Figure 6A:
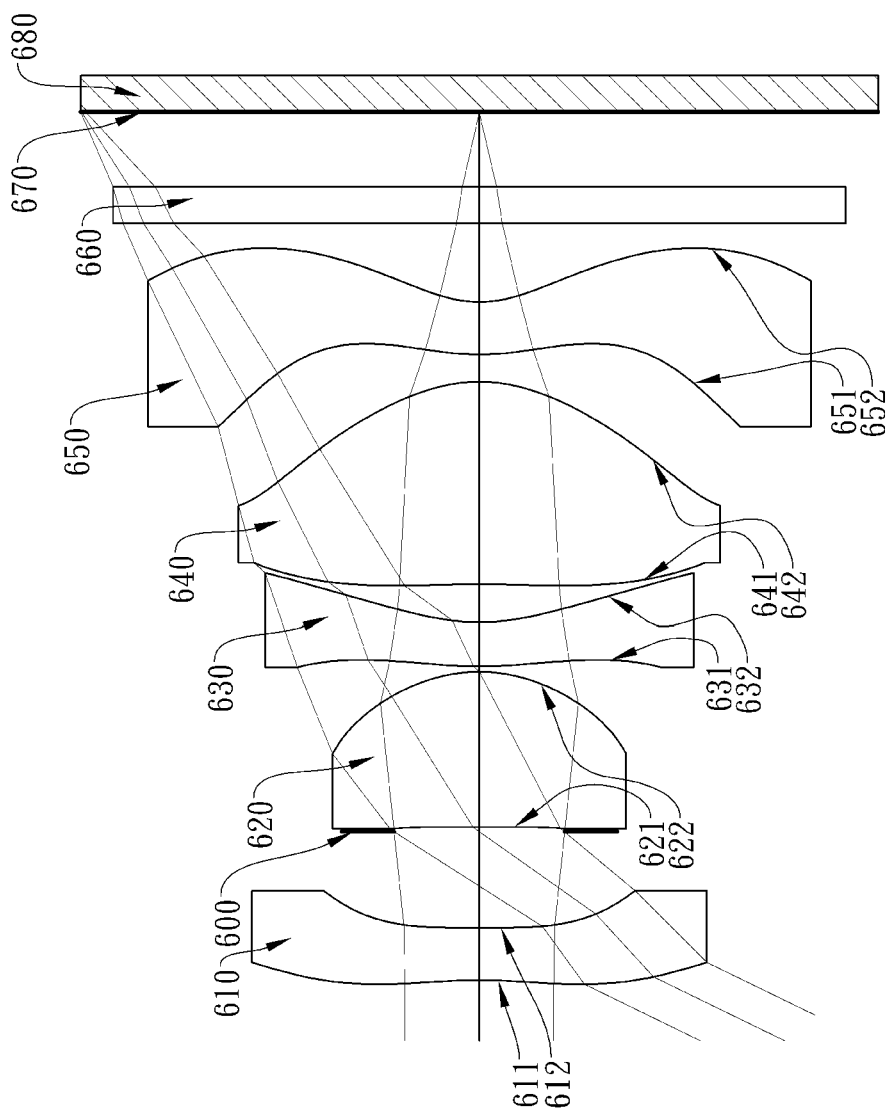
FIG. 6A is a schematic view of an image capturing apparatus according to the 6th embodiment of the present disclosure.
Figure 6B:
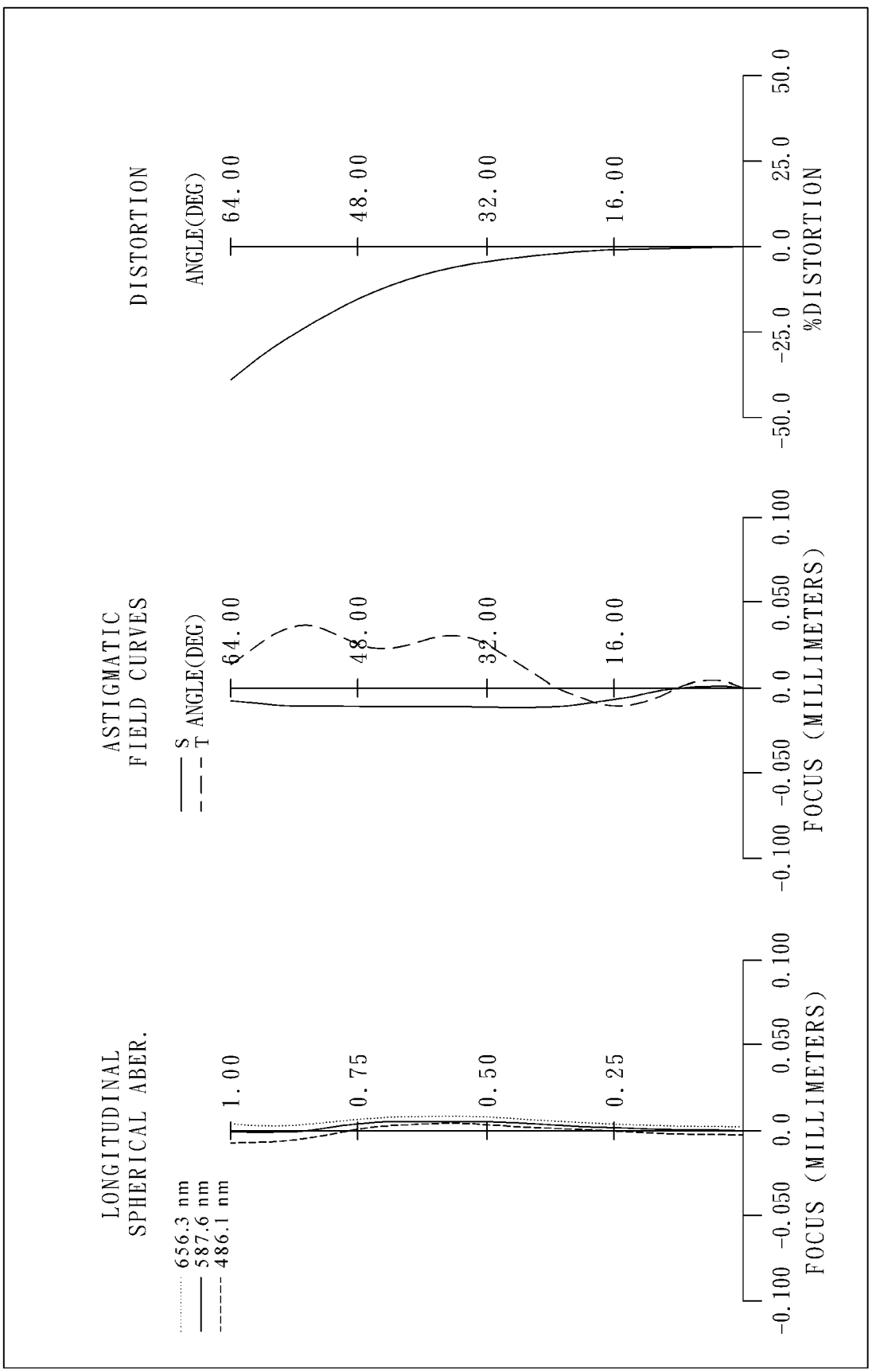
FIG. 6B shows longitudinal spherical aberration curves, astigmatic field curves and a distortion curve of the image capturing apparatus according to the 6th embodiment.

FIG. 6A is a schematic view of an image capturing apparatus according to the 6th embodiment of the present disclosure. FIG. 6B shows, in order from left to right, longitudinal spherical aberration curves, astigmatic field curves and a distortion curve of the image capturing apparatus according to the 6th embodiment.

In FIG. 6A, the image capturing apparatus includes an imaging optical lens assembly (not otherwise herein labeled) of the present disclosure and an image sensor 680. The imaging optical lens assembly includes, in order from an object side to an image side, a first lens element 610, an aperture stop 600, a second lens element 620, a third lens element 630, a fourth lens element 640, and a fifth lens element 650.

The first lens element 610 with negative refractive power has an object-side surface 611 being concave in a paraxial region thereof and an image-side surface 612 being concave in a paraxial region thereof, which are both aspheric, and at least one convex shape in an off-axial region on the object-side surface 611. The first lens element 610 is made of plastic material.

The second lens element 620 with positive refractive power has an object-side surface 621 being convex in a paraxial region thereof and an image-side surface 622 being convex in a paraxial region thereof, which are both aspheric, and the second lens element 620 is made of plastic material.

The third lens element 630 with negative refractive power has an object-side surface 631 being convex in a paraxial region thereof and an image-side surface 632 being concave in a paraxial region thereof, which are both aspheric, and the third lens element 630 is made of plastic material.

The fourth lens element 640 with positive refractive power has an object-side surface 641 being concave in a paraxial region thereof and an image-side surface 642 being convex in a paraxial region thereof, which are both aspheric, and the fourth lens element 640 is made of plastic material.

The fifth lens element 650 with negative refractive power has an object-side surface 651 being convex in a paraxial region thereof and an image-side surface 652 being concave in a paraxial region thereof, which are both aspheric, and at least one convex shape in an off-axial region on the image-side surface 652. The fifth lens element 650 is made of plastic material.

The imaging optical lens assembly further includes an IR cut filter 660 located between the fifth lens element 650 and an image surface 670. The IR cut filter 660 is made of glass material and will not affect the focal length of the imaging optical lens assembly. The image sensor 680 is disposed on or near the image surface 670 of the imaging optical lens assembly.

The detailed optical data of the 6th embodiment are shown in TABLE 15, and the aspheric surface data are shown in TABLE 16, wherein the units of the curvature radius, the thickness and the focal length are expressed in mm, and HFOV is half of the maximal field of view.

TABLE 15

(6th Embodiment)
f = 1.88 mm, Fno = 2.20, HFOV = 64.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.929 | ASP | 0.300 | Plastic | 1.544 | 55.9 | −5.21 |
| 2 | | 90.818 | ASP | 0.551 | | | | |
| 3 | Ape. Stop | Plano | | 0.025 | | | | |
| 4 | Lens 2 | 36.192 | ASP | 0.891 | Plastic | 1.544 | 55.9 | 1.62 |
| 5 | | −0.898 | ASP | 0.031 | | | | |
| 6 | Lens 3 | 2.476 | ASP | 0.250 | Plastic | 1.639 | 23.5 | −3.97 |
| 7 | | 1.204 | ASP | 0.217 | | | | |
| 8 | Lens 4 | −5.475 | ASP | 1.161 | Plastic | 1.544 | 55.9 | 1.73 |
| 9 | | −0.863 | ASP | 0.156 | | | | |
| 10 | Lens 5 | 1.371 | ASP | 0.300 | Plastic | 1.639 | 23.5 | −1.99 |
| 11 | | 0.603 | ASP | 0.450 | | | | |
| 12 | IR Cut Filter | Plano | | 0.210 | Glass | 1.517 | 64.2 | — |
| 13 | | Plano | | 0.429 | | | | |
| 14 | Image Surface | Plano | | — | | | | |

Note:
Reference wavelength is d-line 587.6 nm

TABLE 16

Aspheric Coefficients

| Surface # | 1 | 2 | 4 | 5 | 6 |
|---|---|---|---|---|---|
| k = | −5.1420E+01 | 2.0000E+01 | −7.4850E+01 | −1.3649E+00 | −1.2954E+00 |
| A4 = | 2.1127E−01 | 5.5573E−01 | −1.1867E−01 | −4.4062E−02 | −3.9805E−01 |
| A6 = | −1.6122E−01 | −6.2580E−01 | −3.2695E−01 | 5.5863E−02 | 3.9835E−01 |
| A8 = | 9.2565E−02 | 7.4185E−01 | 6.0112E−01 | −7.9819E−01 | −2.4878E−01 |
| A10 = | −3.3359E−02 | −3.9450E−01 | −2.5100E+00 | 1.3323E+00 | 3.6988E−02 |
| A12 = | 4.9157E−03 | | | −1.1085E+00 | 1.6968E−02 |

| Surface # | 7 | 8 | 9 | 10 | 11 |
|---|---|---|---|---|---|
| k = | −1.5056E+00 | −4.9986E+00 | −9.2503E−01 | −1.5125E+01 | −3.9176E+00 |
| A4 = | −3.9659E−01 | 3.0712E−01 | 3.3264E−01 | −2.2900E−01 | −2.1423E−01 |
| A6 = | 4.4440E−01 | −4.2682E−01 | −4.0747E−01 | 9.5703E−03 | 1.4216E−01 |
| A8 = | −3.1225E−01 | 4.4620E−01 | 3.6777E−01 | 3.3828E−02 | −7.1977E−02 |
| A10 = | 1.2478E−01 | −2.9023E−01 | −2.1223E−01 | −2.2585E−02 | 2.4650E−02 |
| A12 = | −2.2626E−02 | 1.0817E−01 | 7.2987E−02 | 8.5888E−03 | −5.3438E−03 |
| A14 = | 4.5350E−04 | −1.9819E−02 | −1.0387E−02 | −1.2336E−03 | 6.4719E−04 |
| A16 = | | 1.1733E−03 | | | −3.2311E−05 |

In the 6th embodiment, the equation of the aspheric surface profiles of the aforementioned lens elements is the same as the equation of the 1st embodiment. Also, the definitions of these parameters shown in TABLE 17 below are the same as those stated in the 1st embodiment with corresponding values for the 6th embodiment, so an explanation in this regard will not be provided again.

Moreover, these parameters can be calculated from TABLE 15 and TABLE 16 and satisfy the conditions stated in TABLE 17.

TABLE 17

6th Embodiment

| | | | |
|---|---|---|---|
| f [mm] | 1.88 | f1/f3 | 1.31 |
| Fno | 2.20 | f5/f3 | 0.50 |
| HFOV [deg.] | 64.0 | Y52/f | 1.01 |
| V5 | 23.5 | Yc11/f | 0.31 |
| (V3 + V5)/V4 | 0.84 | Yc11/Yc52 | 0.47 |
| (T23 + T34 + T45)/T12 | 0.70 | ImgH/f | 1.21 |
| R1/f | −1.56 | TL/ImgH | 2.18 |
| |R4/R3| | 0.02 | BL/ImgH | 0.48 |
| |f4/f3| | 0.44 | tan(HFOV) | 2.05 |

7th Embodiment

Figure 7A:
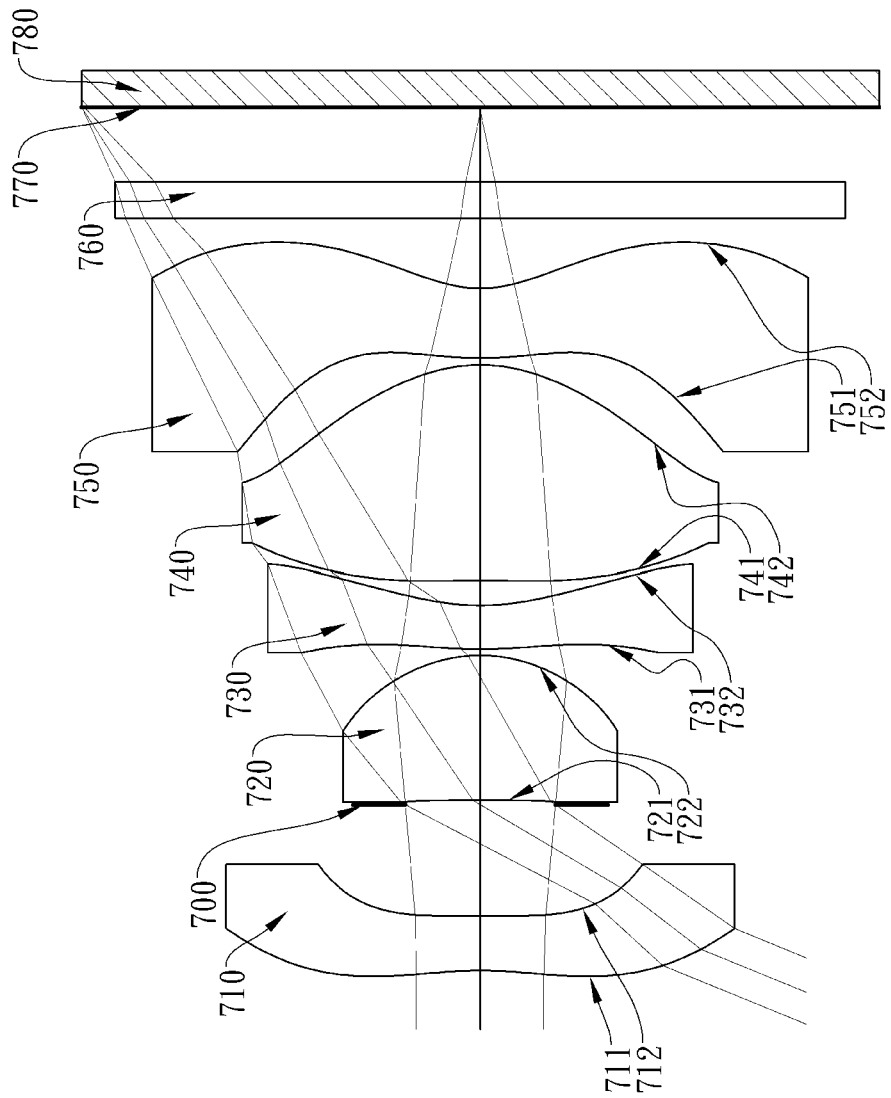
FIG. 7A is a schematic view of an image capturing apparatus according to the 7th embodiment of the present disclosure.
Figure 7B:
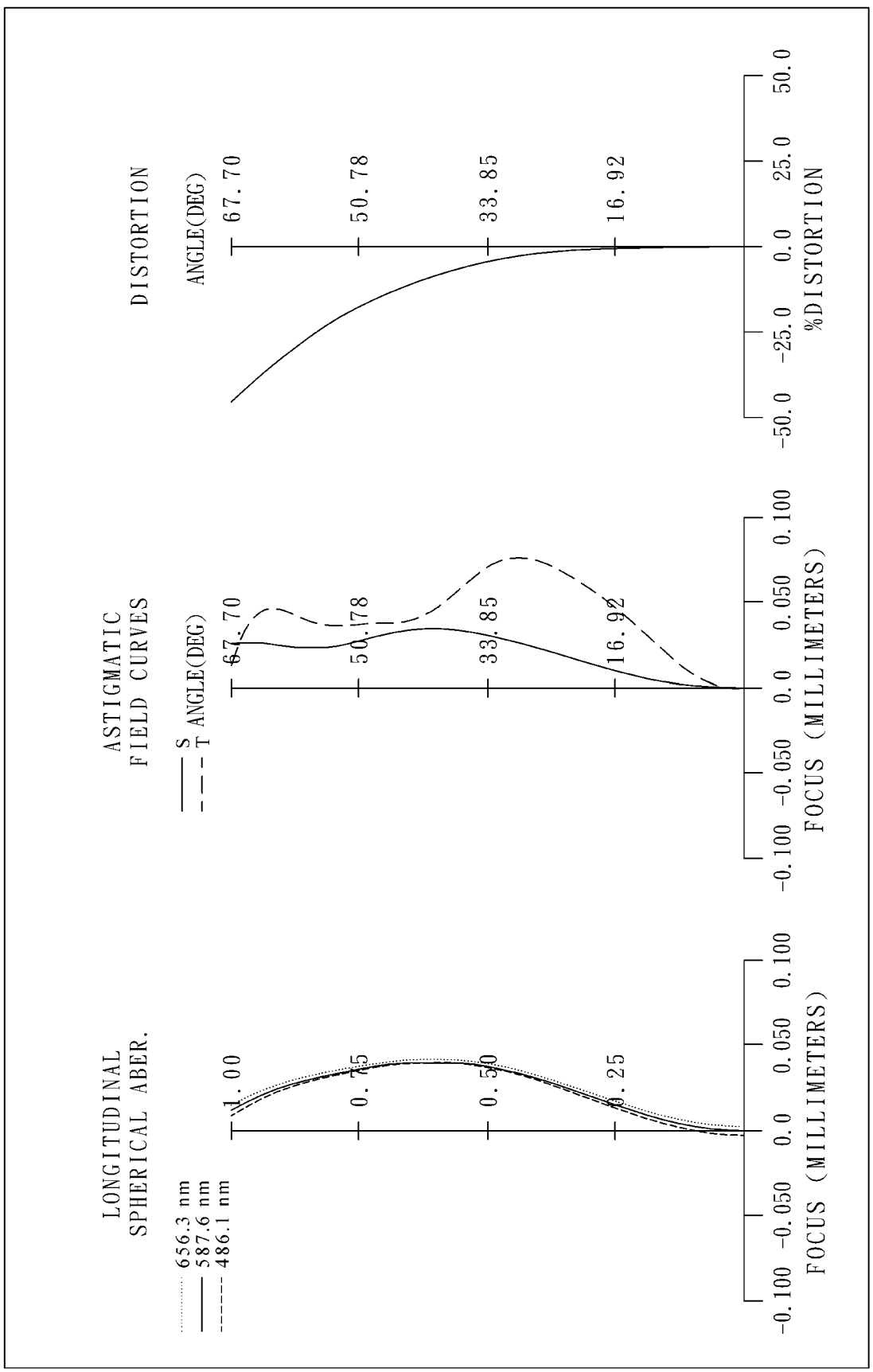
FIG. 7B shows longitudinal spherical aberration curves, astigmatic field curves and a distortion curve of the image capturing apparatus according to the 7th embodiment.

FIG. 7A is a schematic view of an image capturing apparatus according to the 7th embodiment of the present disclosure. FIG. 7B shows, in order from left to right, longitudinal spherical aberration curves, astigmatic field curves and a distortion curve of the image capturing apparatus according to the 7th embodiment.

In FIG. 7A, the image capturing apparatus includes an imaging optical lens assembly (not otherwise herein labeled) of the present disclosure and an image sensor 780. The imaging optical lens assembly includes, in order from an object side to an image side, a first lens element 710, an aperture stop 700, a second lens element 720, a third lens element 730, a fourth lens element 740, and a fifth lens element 750.

The first lens element 710 with negative refractive power has an object-side surface 711 being concave in a paraxial region thereof and an image-side surface 712 being convex in a paraxial region thereof, which are both aspheric, and at least one convex shape in an off-axial region on the object-side surface 711. The first lens element 710 is made of plastic material.

The second lens element 720 with positive refractive power has an object-side surface 721 being concave in a paraxial region thereof and an image-side surface 722 being convex in a paraxial region thereof, which are both aspheric, and the second lens element 720 is made of plastic material.

The third lens element 730 with negative refractive power has an object-side surface 731 being convex in a paraxial region thereof and an image-side surface 732 being concave in a paraxial region thereof, which are both aspheric, and the third lens element 730 is made of plastic material.

The fourth lens element 740 with positive refractive power has an object-side surface 741 being concave in a paraxial region thereof and an image-side surface 742 being convex in a paraxial region thereof, which are both aspheric, and the fourth lens element 740 is made of plastic material.

The fifth lens element 750 with negative refractive power has an object-side surface 751 being convex in a paraxial region thereof and an image-side surface 752 being concave in a paraxial region thereof, which are both aspheric, and at least one convex shape in an off-axial region on the image-side surface 752. The fifth lens element 750 is made of plastic material.

The imaging optical lens assembly further includes an IR cut filter 760 located between the fifth lens element 750 and an image surface 770. The IR cut filter 760 is made of glass material and will not affect the focal length of the imaging optical lens assembly. The image sensor 780 is disposed on or near the image surface 770 of the imaging optical lens assembly.

The detailed optical data of the 7th embodiment are shown in TABLE 18, and the aspheric surface data are shown in TABLE 19, wherein the units of the curvature radius, the thickness and the focal length are expressed in mm, and HFOV is half of the maximal field of view.

TABLE 18

(7th Embodiment)
f = 1.75 mm, Fno = 2.40, HFOV = 67.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.287 | ASP | 0.314 | Plastic | 1.544 | 56.0 | −5.18 |
| 2 | | −12.719 | ASP | 0.637 | | | | |
| 3 | Ape. Stop | Plano | | 0.025 | | | | |
| 4 | Lens 2 | −48.165 | ASP | 0.831 | Plastic | 1.544 | 56.0 | 1.59 |
| 5 | | −0.856 | ASP | 0.035 | | | | |
| 6 | Lens 3 | 2.541 | ASP | 0.250 | Plastic | 1.639 | 23.5 | −4.52 |
| 7 | | 1.299 | ASP | 0.143 | | | | |
| 8 | Lens 4 | −8.428 | ASP | 1.233 | Plastic | 1.544 | 56.0 | 1.75 |
| 9 | | −0.899 | ASP | 0.039 | | | | |
| 10 | Lens 5 | 1.928 | ASP | 0.400 | Plastic | 1.639 | 23.5 | −1.88 |
| 11 | | 0.680 | ASP | 0.400 | | | | |
| 12 | IR Cut Filter | Plano | | 0.210 | Glass | 1.517 | 64.2 | — |
| 13 | | Plano | | 0.427 | | | | |
| 14 | Image Surface | Plano | | — | | | | |

Note:
Reference wavelength is d-line 587.6 nm

TABLE 19

Aspheric Coefficients

| Surface # | 1 | 2 | 4 | 5 | 6 |
|---|---|---|---|---|---|
| k = | −2.9617E+01 | −1.9390E+01 | 1.6857E+01 | −1.1144E+00 | −2.4878E+00 |
| A4 = | 2.4717E−01 | 6.2147E−01 | −1.6110E−01 | −1.3325E−02 | −4.9884E−01 |
| A6 = | −1.9982E−01 | −6.4416E−01 | −3.5710E−01 | −5.1141E−01 | 6.9289E−01 |
| A8 = | 1.3968E−01 | 7.3019E−01 | −3.1305E−01 | 1.5980E+00 | −7.0612E−01 |
| A10 = | −6.0060E−02 | −2.6102E−01 | | −3.2287E+00 | 3.8431E−01 |
| A12 = | 1.3492E−02 | | | 1.8308E+00 | −7.4049E−02 |
| A14 = | −1.2333E−03 | | | | |

| Surface # | 7 | 8 | 9 | 10 | 11 |
|---|---|---|---|---|---|
| k = | −1.4421E+00 | 1.5521E+00 | −9.0427E−01 | −9.0094E−01 | −3.9821E+00 |
| A4 = | −3.8570E−01 | 3.8701E−01 | 3.0866E−01 | −6.3212E−01 | −2.4029E−01 |
| A6 = | 4.9236E−01 | −5.0177E−01 | −4.9187E−01 | 5.7320E−01 | 1.6903E−01 |
| A8 = | −4.7540E−01 | 4.5694E−01 | 5.3256E−01 | −8.7867E−01 | −1.0069E−01 |
| A10 = | 3.0664E−01 | −2.6500E−01 | −3.1695E−01 | 9.8020E−01 | 4.5185E−02 |
| A12 = | −1.1596E−01 | 8.7894E−02 | 1.0243E−01 | −5.9596E−01 | −1.3014E−02 |
| A14 = | 1.8218E−02 | −1.2567E−02 | −1.3471E−02 | 1.8175E−01 | 2.0282E−03 |
| A16 = | | | | −2.1786E−02 | −1.2729E−04 |

In the 7th embodiment, the equation of the aspheric surface profiles of the aforementioned lens elements is the same as the equation of the 1st embodiment. Also, the definitions of these parameters shown in TABLE 20 below are the same as those stated in the 1st embodiment with corresponding values for the 7th embodiment, so an explanation in this regard will not be provided again.

Moreover, these parameters can be calculated from TABLE 18 and TABLE 19 and satisfy the conditions stated in TABLE 20.

TABLE 20

| 7th Embodiment | | | |
|---|---|---|---|
| f [mm] | 1.75 | f1/f3 | 1.15 |
| Fno | 2.40 | f5/f3 | 0.42 |
| HFOV [deg.] | 67.7 | Y52/f | 1.07 |
| V5 | 23.5 | Yc11/f | 0.35 |
| (V3 + V5)/V4 | 0.84 | Yc11/Yc52 | 0.53 |
| (T23 + T34 + T45)/T12 | 0.33 | ImgH/f | 1.30 |
| R1/f | −1.30 | TL/ImgH | 2.16 |
| |R4/R3| | 0.02 | BL/ImgH | 0.45 |
| |f4/f3| | 0.39 | tan(HFOV) | 2.44 |

8th Embodiment

Figure 8A:
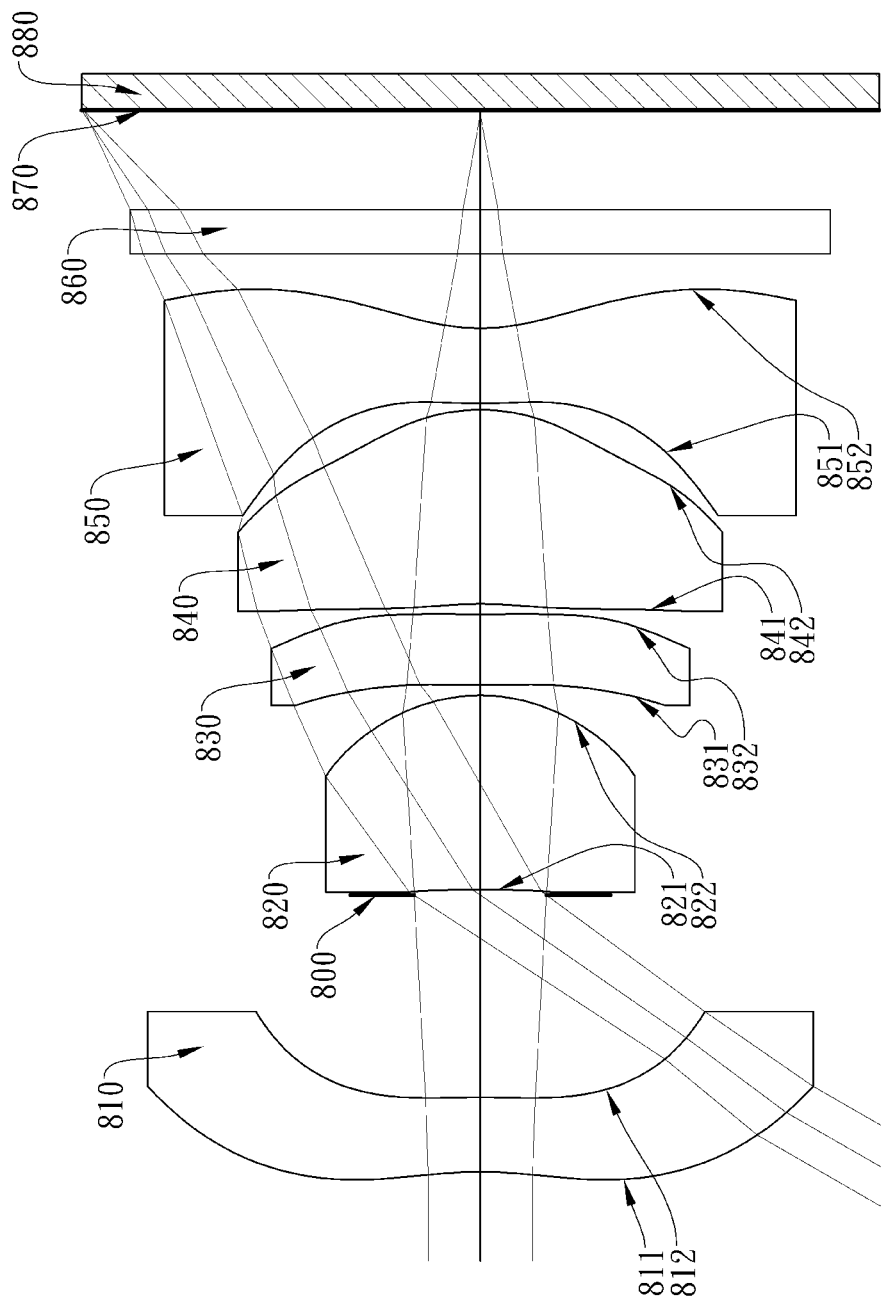
FIG. 8A is a schematic view of an image capturing apparatus according to the 8th embodiment of the present disclosure.
Figure 8B:
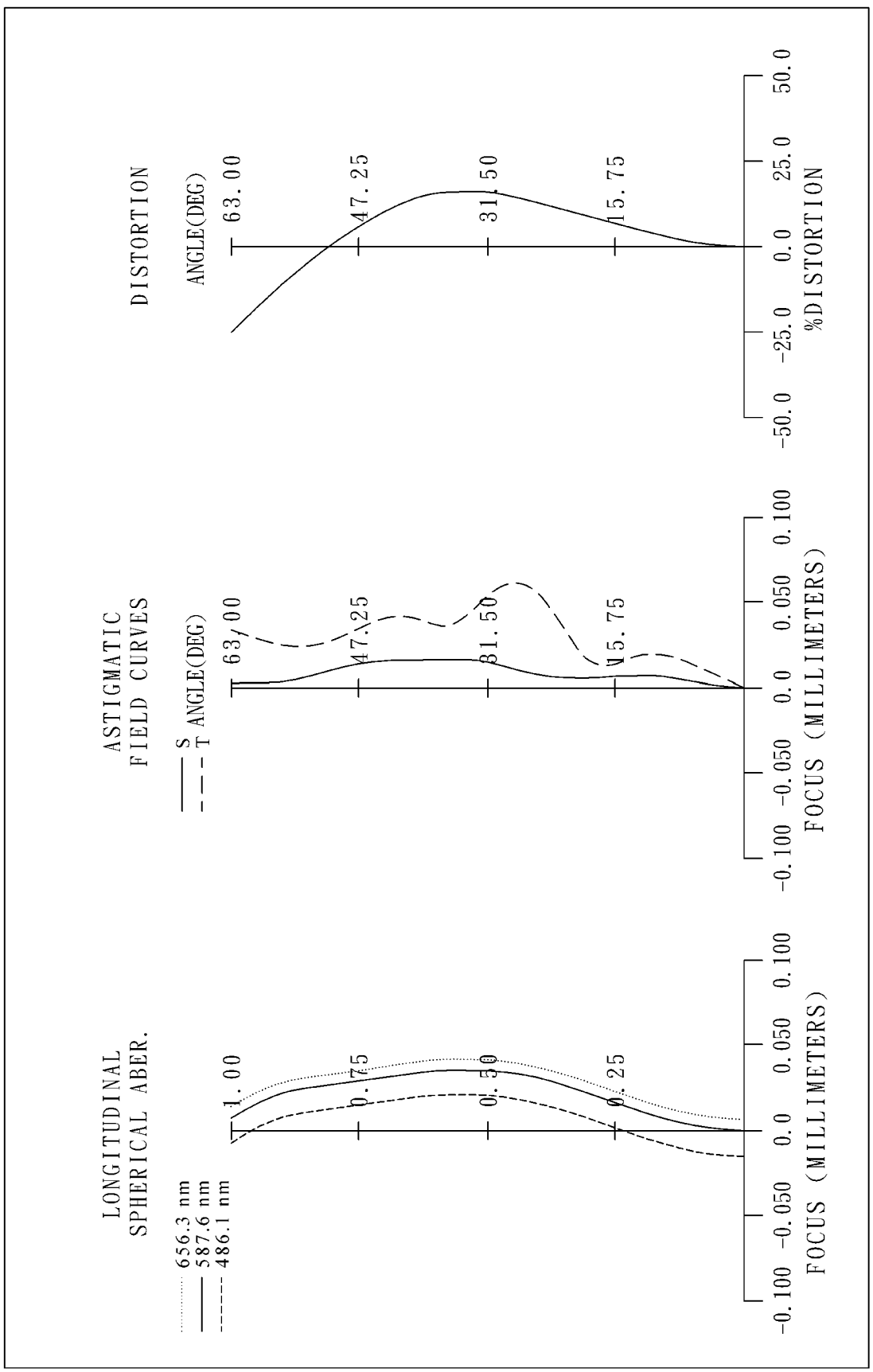
FIG. 8B shows longitudinal spherical aberration curves, astigmatic field curves and a distortion curve of the image capturing apparatus according to the 8th embodiment.

FIG. 8A is a schematic view of an image capturing apparatus according to the 8th embodiment of the present disclosure. FIG. 8B shows, in order from left to right, longitudinal spherical aberration curves, astigmatic field curves and a distortion curve of the image capturing apparatus according to the 8th embodiment.

In FIG. 8A, the image capturing apparatus includes an imaging optical lens assembly (not otherwise herein labeled) of the present disclosure and an image sensor 880. The imaging optical lens assembly includes, in order from an object side to an image side, a first lens element 810, an aperture stop 800, a second lens element 820, a third lens element 830, a fourth lens element 840, and a fifth lens element 850.

The first lens element 810 with negative refractive power has an object-side surface 811 being concave in a paraxial region thereof and an image-side surface 812 being convex in a paraxial region thereof, which are both aspheric, and at least one convex shape in an off-axial region on the object-side surface 811. The first lens element 810 is made of plastic material.

The second lens element 820 with positive refractive power has an object-side surface 821 being concave in a paraxial region thereof and an image-side surface 822 being convex in a paraxial region thereof, which are both aspheric, and the second lens element 820 is made of plastic material.

The third lens element 830 with positive refractive power has an object-side surface 831 being convex in a paraxial region thereof and an image-side surface 832 being concave in a paraxial region thereof, which are both aspheric, and the third lens element 830 is made of plastic material.

The fourth lens element 840 with positive refractive power has an object-side surface 841 being concave in a paraxial region thereof and an image-side surface 842 being convex in a paraxial region thereof, which are both aspheric, and the fourth lens element 840 is made of plastic material.

The fifth lens element 850 with negative refractive power has an object-side surface 851 being convex in a paraxial region thereof and an image-side surface 852 being concave in a paraxial region thereof, which are both aspheric, and at least one convex shape in an off-axial region on the image-side surface 852. The fifth lens element 850 is made of plastic material.

The imaging optical lens assembly further includes an IR cut filter 860 located between the fifth lens element 850 and an image surface 870. The IR cut filter 860 is made of glass material and will not affect the focal length of the imaging optical lens assembly. The image sensor 880 is disposed on or near the image surface 870 of the imaging optical lens assembly.

The detailed optical data of the 8th embodiment are shown in TABLE 21, and the aspheric surface data are shown in TABLE 22, wherein the units of the curvature radius, the thickness and the focal length are expressed in mm, and HFOV is half of the maximal field of view.

TABLE 21

(8th Embodiment)
f = 1.33 mm, Fno = 2.70, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.761 | ASP | 0.350 | Glass | 1.540 | 59.5 | −4.43 |
| 2 | | −7.148 | ASP | 0.955 | | | | |
| 3 | Ape. Stop | Plano | | 0.025 | | | | |
| 4 | Lens 2 | −10.699 | ASP | 0.917 | Plastic | 1.535 | 56.3 | 1.74 |
| 5 | | −0.883 | ASP | 0.048 | | | | |
| 6 | Lens 3 | 5.141 | ASP | 0.332 | Plastic | 1.544 | 56.0 | 11.08 |
| 7 | | 34.048 | ASP | 0.049 | | | | |
| 8 | Lens 4 | −2.111 | ASP | 0.916 | Plastic | 1.544 | 56.0 | 2.42 |
| 9 | | −0.935 | ASP | 0.030 | | | | |
| 10 | Lens 5 | 2.462 | ASP | 0.355 | Plastic | 1.634 | 23.8 | −2.50 |
| 11 | | 0.911 | ASP | 0.350 | | | | |
| 12 | IR Cut Filter | Plano | | 0.210 | Glass | 1.517 | 64.2 | — |
| 13 | | Plano | | 0.468 | | | | |
| 14 | Image Surface | Plano | | — | | | | |

Note:
Reference wavelength is d-line 587.6 nm

TABLE 22

Aspheric Coefficients

| Surface # | 1 | 2 | 4 | 5 | 6 |
|---|---|---|---|---|---|
| k = | −2.8974E+01 | −9.0000E+01 | 2.0000E+01 | −8.5573E−01 | −3.2310E+00 |
| A4 = | 2.8292E−01 | 6.4677E−01 | −5.3037E−01 | −4.6044E−01 | −1.0636E+00 |
| A6 = | −1.9177E−01 | −5.8784E−01 | 6.6501E+00 | 1.8116E+00 | 2.6448E+00 |
| A8 = | 8.8578E−02 | 3.8944E−01 | −7.9059E+01 | −4.1125E+00 | −3.7264E+00 |
| A10 = | −2.1114E−02 | −7.6700E−02 | 2.8620E+02 | 3.4492E+00 | 2.6099E+00 |
| A12 = | 2.0041E−03 | | | −1.4292E+00 | −6.8704E−01 |

| Surface # | 7 | 8 | 9 | 10 | 11 |
|---|---|---|---|---|---|
| k = | 1.9759E+01 | −2.6495E+00 | −7.9436E−01 | −3.4941E+01 | −4.2830E+00 |
| A4 = | −9.6835E−02 | 8.9806E−01 | −6.6146E−01 | −1.5483E+00 | −3.6919E−01 |
| A6 = | −6.5760E−01 | −1.8095E+00 | 3.0861E+00 | 3.0160E+00 | 4.5778E−01 |
| A8 = | 1.0481E+00 | 1.9248E+00 | −4.4611E+00 | −3.6828E+00 | −4.2078E−01 |
| A10 = | −5.9582E−01 | −1.1774E+00 | 3.0829E+00 | 2.4215E+00 | 2.4727E−01 |
| A12 = | 1.2368E−01 | 4.4092E−01 | −1.0556E+00 | −7.8357E−01 | −8.6920E−02 |

TABLE 22-continued

| Aspheric Coefficients | | | | | |
|---|---|---|---|---|---|
| A14 = | −3.3061E−03 | −1.0565E−01 | 1.4511E−01 | 9.6759E−02 | 1.6710E−02 |
| A16 = | | 1.3069E−02 | | | −1.3512E−03 |

In the 8th embodiment, the equation of the aspheric surface profiles of the aforementioned lens elements is the same as the equation of the 1st embodiment. Also, the definitions of these parameters shown in TABLE 23 below are the same as those stated in the 1st embodiment with corresponding values for the 8th embodiment, so an explanation in this regard will not be provided again.

Moreover, these parameters can be calculated from TABLE 21 and TABLE 22 and satisfy the conditions stated in TABLE 23.

TABLE 23

| 8th Embodiment | | | |
|---|---|---|---|
| f [mm] | 1.33 | f1/f3 | −0.40 |
| Fno | 2.70 | f5/f3 | −0.23 |
| HFOV [deg.] | 60.0 | Y52/f | 1.12 |
| V5 | 23.8 | Yc11/f | 0.44 |
| (V3 + V5)/V4 | 1.43 | Yc11/Yc52 | 0.56 |
| (T23 + T34 + T45)/T12 | 0.13 | ImgH/f | 1.41 |
| R1/f | −1.32 | TL/ImgH | 2.66 |
| |R4/R3| | 0.08 | BL/ImgH | 0.55 |
| |f4/f3| | 0.22 | tan(HFOV) | 1.73 |

9th Embodiment

Figure 9A:
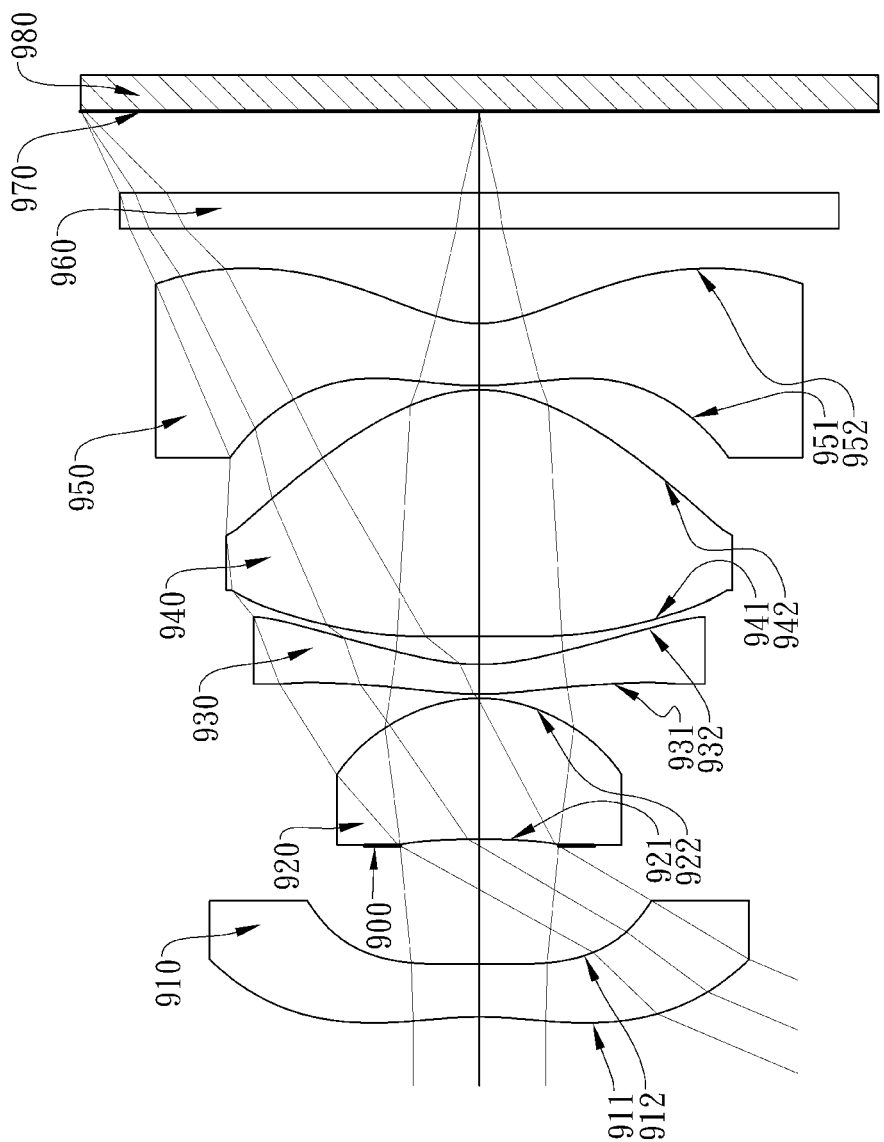
FIG. 9A is a schematic view of an image capturing apparatus according to the 9th embodiment of the present disclosure.
Figure 9B:
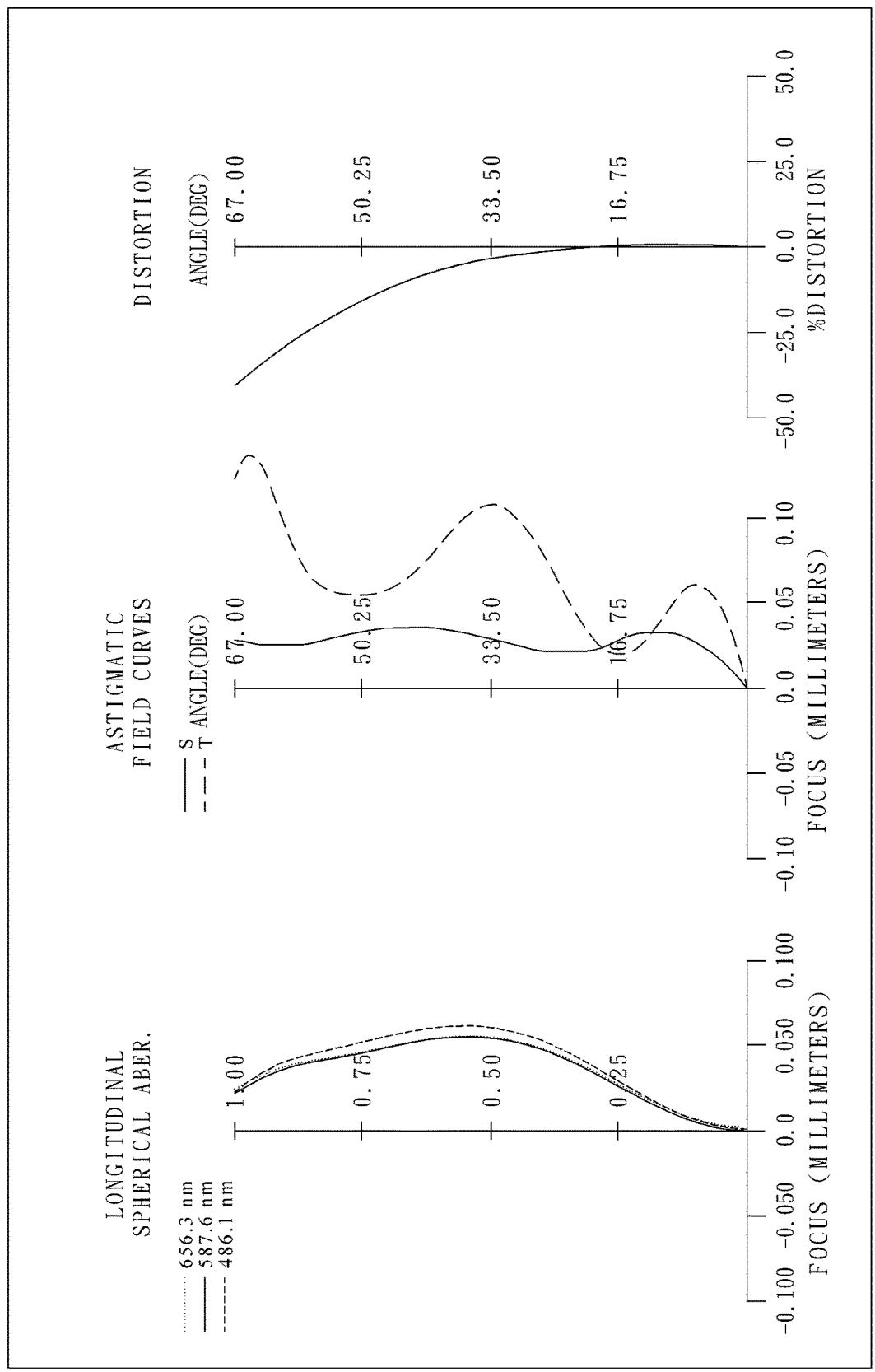
FIG. 9B shows longitudinal spherical aberration curves, astigmatic field curves and a distortion curve of the image capturing apparatus according to the 9th embodiment.

FIG. 9A is a schematic view of an image capturing apparatus according to the 9th embodiment of the present disclosure. FIG. 9B shows, in order from left to right, longitudinal spherical aberration curves, astigmatic field curves and a distortion curve of the image capturing apparatus according to the 9th embodiment.

In FIG. 9A, the image capturing apparatus includes an imaging optical lens assembly (not otherwise herein labeled) of the present disclosure and an image sensor 980. The imaging optical lens assembly includes, in order from an object side to an image side, a first lens element 910, an aperture stop 900, a second lens element 920, a third lens element 930, a fourth lens element 940, and a fifth lens element 950.

The first lens element 910 with negative refractive power has an object-side surface 911 being concave in a paraxial region thereof and an image-side surface 912 being convex in a paraxial region thereof, which are both aspheric, and at least one convex shape in an off-axial region on the object-side surface 911. The first lens element 910 is made of plastic material.

The second lens element 920 with positive refractive power has an object-side surface 921 being concave in a paraxial region thereof and an image-side surface 922 being convex in a paraxial region thereof, which are both aspheric, and the second lens element 920 is made of plastic material.

The third lens element 930 with negative refractive power has an object-side surface 931 being convex in a paraxial region thereof and an image-side surface 932 being concave in a paraxial region thereof, which are both aspheric, and the third lens element 930 is made of plastic material.

The fourth lens element 940 with positive refractive power has an object-side surface 941 being concave in a paraxial region thereof and an image-side surface 942 being convex in a paraxial region thereof, which are both aspheric, and the fourth lens element 940 is made of plastic material.

The fifth lens element 950 with negative refractive power has an object-side surface 951 being convex in a paraxial region thereof and an image-side surface 952 being concave in a paraxial region thereof, which are both aspheric, and at least one convex shape in an off-axial region on the image-side surface 952. The fifth lens element 950 is made of plastic material.

The imaging optical lens assembly further includes an IR cut filter 960 located between the fifth lens element 950 and an image surface 970. The IR cut filter 960 is made of glass material and will not affect the focal length of the imaging optical lens assembly. The image sensor 980 is disposed on or near the image surface 970 of the imaging optical lens assembly.

The detailed optical data of the 9th embodiment are shown in TABLE 24, and the aspheric surface data are shown in TABLE 25, wherein the units of the curvature radius, the thickness and the focal length are expressed in mm, and HFOV is half of the maximal field of view.

TABLE 24

(9th Embodiment)
f = 2.46 mm, Fno = 2.20, HFOV = 67.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.152 | ASP | 0.446 | Plastic | 1.544 | 56.0 | −2.87 |
| 2 | | −19.568 | ASP | 0.995 | | | | |
| 3 | Ape. Stop | Plano | | 0.056 | | | | |
| 4 | Lens 2 | −8.452 | ASP | 1.190 | Plastic | 1.544 | 56.0 | 1.50 |
| 5 | | −1.268 | ASP | 0.035 | | | | |
| 6 | Lens 3 | 2.855 | ASP | 0.250 | Plastic | 1.660 | 20.4 | −3.69 |
| 7 | | 1.796 | ASP | 0.236 | | | | |
| 8 | Lens 4 | −15.222 | ASP | 2.073 | Plastic | 1.544 | 56.0 | 1.57 |
| 9 | | −1.179 | ASP | 0.035 | | | | |
| 10 | Lens 5 | 2.465 | ASP | 0.523 | Plastic | 1.639 | 23.5 | −1.65 |
| 11 | | 0.926 | ASP | 0.800 | | | | |
| 12 | IR Cut Filter | Plano | | 0.300 | Glass | 1.517 | 64.2 | — |

TABLE 24-continued (9th Embodiment)
f = 2.46 mm, Fno = 2.20, HFOV = 67.0 deg.

| Surface # | | Curvature Radius | Thickness | Material | Index | Abbe # | Focal Length |
|---|---|---|---|---|---|---|---|
| 13 | | Plano | 0.690 | | | | |
| 14 | Image Surface | Plano | — | | | | |

Note:
Reference wavelength is d-line 587.6 nm

TABLE 25

Aspheric Coefficients

| Surface # | 1 | 2 | 4 | 5 | 6 |
|---|---|---|---|---|---|
| k = | −2.8840E+01 | −9.0000E+01 | 1.9873E+01 | −1.1773E+00 | −2.6191E+00 |
| A4 = | 8.0482E−02 | 1.9150E−01 | −6.0435E−02 | −3.3772E−03 | −1.5899E−01 |
| A6 = | −2.8568E−02 | −6.5994E−02 | −1.2856E−02 | −2.3102E−02 | 9.8380E−02 |
| A8 = | 7.3014E−03 | 3.6971E−03 | −5.3004E−02 | 2.6928E−02 | −3.1640E−02 |
| A10 = | −9.7787E−04 | 1.5276E−02 | 7.7017E−03 | −3.5313E−02 | 4.3625E−03 |
| A12 = | 5.2989E−05 | −4.0279E−03 | | 8.9250E−03 | −1.4619E−04 |
| A14 = | | | | | |

| Surface # | 7 | 8 | 9 | 10 | 11 |
|---|---|---|---|---|---|
| k = | −1.4585E+00 | −2.4327E+00 | −9.5976E−01 | −3.5099E+01 | −4.6360E+00 |
| A4 = | −1.3205E−01 | 1.2863E−01 | 1.2081E−01 | −5.0695E−02 | −4.1565E−02 |
| A6 = | 6.8536E−02 | −8.0981E−02 | −6.7993E−02 | −9.4619E−03 | 6.4916E−03 |
| A8 = | −2.1337E−02 | 3.3403E−02 | 2.5688E−02 | 2.9283E−03 | −1.4569E−04 |
| A10 = | 3.8367E−03 | −9.0282E−03 | −4.9267E−03 | 9.5512E−04 | −1.6619E−04 |
| A12 = | −3.8832E−04 | 1.5450E−03 | 3.4210E−04 | −4.1322E−04 | 3.5055E−05 |
| A14 = | 1.6096E−05 | −1.5088E−04 | 5.8452E−06 | 3.8054E−05 | −3.1937E−06 |
| A16 = | | 6.5449E−06 | | | 1.1506E−07 |

In the 9th embodiment, the equation of the aspheric surface profiles of the aforementioned lens elements is the same as the equation of the 1st embodiment. Also, the definitions of these parameters shown in TABLE 26 below are the same as those stated in the 1st embodiment with corresponding values for the 9th embodiment, so an explanation in this regard will not be provided again.

Moreover, these parameters can be calculated from TABLE 24 and TABLE 25 and satisfy the conditions stated in TABLE 26.

TABLE 26

9th Embodiment

| | | | |
|---|---|---|---|
| f [mm] | 2.46 | f1/f3 | 0.86 |
| Fno | 2.20 | f5/f3 | 0.33 |
| HFOV [deg.] | 67.0 | Y52/f | 1.11 |
| V5 | 23.5 | Yc11/f | 0.37 |
| (V3 + V5)/V4 | 0.78 | Yc11/Yc52 | 0.46 |
| (T23 + T34 + T45)/T12 | 0.29 | ImgH/f | 1.37 |
| R1/f | −1.28 | TL/ImgH | 2.27 |
| |R4/R3| | 0.15 | BL/ImgH | 0.53 |
| |f4/f3| | 0.28 | tan(HFOV) | 2.36 |

The foregoing description, for purpose of explanation, has been described with reference to specific embodiments. It is to be noted that TABLES 1-26 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly, comprising five lens elements, the five lens elements being, in order from an object side to an image side: a first lens element, a second lens element, a third lens element, a fourth lens element and a fifth lens element; each of the five lens elements comprising an object-side surface facing toward the object side and an image-side surface facing toward the image side;

wherein a total number of lens elements of the imaging optical lens assembly is five, the first lens element has negative refractive power, the fourth lens element has positive refractive power, the fifth lens element has negative refractive power, a central thickness of the first lens element is larger than a central thickness of the third lens element, a curvature radius of the object-side surface of the second lens element and a curvature radius of the image-side surface of the second lens element have the same sign, the curvature radius of the image-side surface of the second lens element and a curvature radius of the image-side surface of the third lens element have different signs, a curvature radius of the object-side surface of the fourth lens element and a curvature radius of the image-side surface of the fifth lens element have different signs;

wherein a focal length of the first lens element is f1, a focal length of the third lens element is f3, the curvature radius of the object-side surface of the second lens element is R3, the curvature radius of the image-side surface of the second lens element is R4, and the following conditions are satisfied:

$f1/f3<5.0$; and $|R4/R3|<2.0$.

2. The imaging optical lens assembly of claim 1, wherein the third lens element has positive refractive power.

3. The imaging optical lens assembly of claim 1, wherein the image-side surface of the fourth lens element is convex in a paraxial region thereof.

4. The imaging optical lens assembly of claim 1, wherein there is an air gap between each of adjacent lens elements of the five lens elements, and the image-side surface of the fifth lens element has at least one critical point.

5. The imaging optical lens assembly of claim 1, wherein half of a maximal field of view of the image optical lens assembly is HFOV, and the following condition is satisfied:

$1.50<\tan(HFOV)$.

6. The imaging optical lens assembly of claim 1, wherein an axial distance between the first lens element and the second lens element is a maximum among axial distances between each of adjacent lens elements of the five lens elements, the curvature radius of the object-side surface of the second lens element is R3, the curvature radius of the image-side surface of the second lens element is R4, and the following condition is satisfied:

$|R4/R3|<1.0$.

7. The imaging optical lens assembly of claim 1, wherein an Abbe number of the fifth lens element is V5, and the following condition is satisfied:

$V5<30$.

8. The imaging optical lens assembly of claim 1, wherein the focal length of the first lens element is f1, the focal length of the third lens element is f3, a focal length of the fifth lens element is f5, and the following conditions are satisfied:

$f5/f3<1.0$; and $f1/f3<2.0$.

9. The imaging optical lens assembly of claim 1, wherein the central thickness of the first lens element is larger than an axial distance between the second lens element and the third lens element.

10. The imaging optical lens assembly of claim 1, wherein a curvature radius of the image-side surface of the first lens element and the curvature radius of the image-side surface of the fifth lens element have different signs.

11. The imaging optical lens assembly of claim 1, wherein the second lens element has positive refractive power.

12. An image capturing apparatus, comprising the imaging optical lens assembly of claim 1 and an image sensor disposed on an image surface of the imaging optical lens assembly.

13. An electronic device, comprising the image capturing apparatus of claim 12.

14. An imaging optical lens assembly, comprising five lens elements, the five lens elements being, in order from an object side to an image side: a first lens element, a second lens element, a third lens element, a fourth lens element and a fifth lens element; each of the five lens elements comprising an object-side surface facing toward the object side and an image-side surface facing toward the image side;

wherein the first lens element has negative refractive power, the fourth lens element has positive refractive power, the image-side surface of the fifth lens element has at least one critical point, a central thickness of the first lens element is larger than a central thickness of the third lens element, a curvature radius of the object-side surface of the second lens element and a curvature radius of the image-side surface of the second lens element have the same sign;

wherein a focal length of the first lens element is f1, a focal length of the third lens element is f3, a focal length of the fourth lens element is f4, a focal length of the fifth lens element is f5, the curvature radius of the object-side surface of the second lens element is R3, the curvature radius of the image-side surface of the second lens element is R4, half of a maximal field of view of the image optical lens assembly is HFOV, and the following conditions are satisfied:

$f1/f3<5.0$;

$|R4/R3|<1.0$;

$1.50<\tan(HFOV)$;

$|f4/f3|<1.0$; and $|f3|>|f5|$.

15. The imaging optical lens assembly of claim 14, wherein the third lens element has positive refractive power, and the image-side surface of the fourth lens element is convex in a paraxial region thereof.

16. The imaging optical lens assembly of claim 14, wherein there is an air gap between each of adjacent lens elements of the five lens elements, an axial distance between the first lens element and the second lens element is a maximum among axial distances between each of adjacent lens elements of the five lens elements, the focal length of the third lens element is f3, the focal length of the fourth lens element is f4, and the following condition is satisfied:

$0.28 \leq |f4/f3|<1.0$.

17. The imaging optical lens assembly of claim 14, wherein the curvature radius of the image-side surface of the second lens element and a curvature radius of the image-side surface of the third lens element have different signs, half of the maximal field of view of the image optical lens assembly is HFOV, and the following condition is satisfied:

$1.50<\tan(HIFOV) \leq 3.08$.

18. The imaging optical lens assembly of claim 14, wherein the central thickness of the first lens element is larger than an axial distance between the second lens element and the third lens element, the focal length of the first lens element is f1, the focal length of the fifth lens element is f5, and the following condition is satisfied:

$|f1|>|f5|$.

19. The imaging optical lens assembly of claim 14, wherein an absolute value of a curvature radius of the object-side surface of the third lens element is larger than an absolute value of a curvature radius of the image-side surface of the fifth lens element, the curvature radius of the image-side surface of the second lens element and the curvature radius of the image-side surface of the fifth lens element have different signs.

20. The imaging optical lens assembly of claim 14, wherein the second lens element has positive refractive power and the fifth lens element has negative refractive power.

21. An imaging optical lens assembly, comprising five lens elements, the five lens elements being, in order from an object side to an image side: a first lens element, a second lens element, a third lens element, a fourth lens element and a fifth lens element; each of the five lens elements comprising an object-side surface facing toward the object side and an image-side surface facing toward the image side;

wherein the first lens element has negative refractive power, the fifth lens element has negative refractive power, a central thickness of the first lens element is larger than a central thickness of the third lens element, a curvature radius of the object-side surface of the second lens element and a curvature radius of the image-side surface of the second lens element have the same sign, the curvature radius of the image-side surface of the second lens element and a curvature radius of the object-side surface of the fifth lens element have different signs, an absolute value of a curvature radius of the object-side surface of the third lens element is larger than an absolute value of a curvature radius of the image-side surface of the fifth lens element;

wherein a focal length of the first lens element is f1, a focal length of the third lens element is f3, the curvature radius of the object-side surface of the second lens element is R3, the curvature radius of the image-side surface of the second lens element is R4, half of a maximal field of view of the image optical lens assembly is HFOV, and the following conditions are satisfied:

$f1/f3<5.0$;

$|R4/R3|<1.0$; and $1.50<\tan(\text{HFOV})$.

22. The imaging optical lens assembly of claim 21, wherein the image-side surface of the fourth lens element is convex in a paraxial region thereof, and the image-side surface of the fifth lens element has at least one critical point.

23. The imaging optical lens assembly of claim 21, wherein an axial distance between the first lens element and the second lens element is a maximum among axial distances between each of adjacent lens elements of the five lens elements, the focal length of the third lens element is f3, a focal length of the fifth lens element is f5, and the following condition is satisfied:

$f5/f3<1.0$.

24. The imaging optical lens assembly of claim 21, wherein the curvature radius of the image-side surface of the second lens element and the curvature radius of the image-side surface of the fifth lens element have different signs, the focal length of the first lens element is f1, the focal length of the third lens element is f3, and the following condition is satisfied:

$f1/f3<2.0$.

25. The imaging optical lens assembly of claim 21, wherein half of the maximal field of view of the image optical lens assembly is HFOV, the focal length of the first lens element is f1, a focal length of the fifth lens element is f5, and the following conditions are satisfied:

$1.50<\tan(\text{HFOV})\leq3.08$; and $|f1|>|f5|$.

26. The imaging optical lens assembly of claim 21, wherein the central thickness of the first lens element is larger than an axial distance between the second lens element and the third lens element, the focal length of the third lens element is f3, a focal length of the fourth lens element is f4, and the following condition is satisfied:

$0.28\leq|f4/f3|<1.0$.

27. The imaging optical lens assembly of claim 21, wherein the second lens element has positive refractive power and the fourth lens element has positive refractive power.

* * * * *